US007929953B2

(12) United States Patent
Jiang

(10) Patent No.: US 7,929,953 B2
(45) Date of Patent: Apr. 19, 2011

(54) CONTROLLING TRAFFIC OF AN INBOUND ROAMING MOBILE STATION BETWEEN A FIRST VPMN, A SECOND VPMN AND A HPMN

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 844 days.

(21) Appl. No.: 11/402,128

(22) Filed: Apr. 12, 2006

(65) Prior Publication Data
US 2007/0173252 A1     Jul. 26, 2007

Related U.S. Application Data

(63) Continuation-in-part of application No. 11/374,437, filed on Mar. 14, 2006, and a continuation-in-part of application No. 10/635,804, filed on Aug. 5, 2003, now Pat. No. 7,072,651.

(60) Provisional application No. 60/670,914, filed on Apr. 12, 2005.

(51) Int. Cl.
*H04M 3/42* (2006.01)
*H04W 4/00* (2009.01)
(52) U.S. Cl. ............... 455/414.1; 455/432.1; 455/433
(58) Field of Classification Search ............... 455/414.1, 455/432.1, 433
See application file for complete search history.

(56) References Cited

U.S. PATENT DOCUMENTS
5,353,328 A     10/1994  Jokimies
(Continued)

FOREIGN PATENT DOCUMENTS
CA          2281041 A1     2/2001
(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner* — William D Cumming
(74) *Attorney, Agent, or Firm* — Arent Fox, LLP

(57) ABSTRACT

A system for controlling traffic of an inbound roaming mobile station between a first Visiting Public Mobile Network (VPMN), a second VPMN and a Home Public Mobile Network (HPMN) is provided. The system includes a detection unit for detecting a possible change in registration of the inbound roaming mobile station at a second VPMN upon receipt of a first registration cancellation message of one or more registration cancellation messages at the first VPMN from the HPMN. The system further includes redirection unit for attempting to redirect the traffic of the inbound roaming mobile station back to the first VPMN by sending one or more registration messages from the first VPMN to the HPMN subsequent to receipt of one or more registration cancellation messages from the HPMN. For each registration cancellation message received, one or more registration messages are sent within a first pre-defined interval of time (T0) until one registration message is recorded as a successful transaction. Further for all registration cancellation messages received in current attempt to redirect the inbound roaming mobile station to the first VPMN, all the registration messages are sent either within a second pre-defined interval of time (T1) and/or a re-registration threshold number of times.

59 Claims, 10 Drawing Sheets

Inbound-TR Signal Flow

U.S. PATENT DOCUMENTS

| | | | |
|---|---|---|---|
| 5,586,166 A | 12/1996 | Turban | |
| 5,742,910 A | 4/1998 | Gallant et al. | |
| 5,764,730 A | 6/1998 | Rabe et al. | |
| 5,818,824 A | 10/1998 | Lu et al. | |
| 5,854,982 A | 12/1998 | Chambers et al. | |
| 5,901,359 A | 5/1999 | Malmstrom | |
| 5,903,832 A | 5/1999 | Seppanen et al. | |
| 5,930,701 A | 7/1999 | Skog | |
| 5,940,490 A | 8/1999 | Foster et al. | |
| 5,943,620 A | 8/1999 | Boltz et al. | |
| 5,953,653 A | 9/1999 | Josenhans et al. | |
| 5,987,318 A | 11/1999 | Alperovich et al. | |
| 5,987,323 A | 11/1999 | Huotori | |
| 5,987,325 A | 11/1999 | Tayloe | |
| 6,014,561 A | 1/2000 | Mölne | |
| 6,052,604 A | 4/2000 | Bishop et al. | |
| 6,058,309 A | 5/2000 | Huang et al. | |
| 6,075,855 A | 6/2000 | Christiansen et al. | |
| 6,085,084 A | 7/2000 | Christmas | |
| 6,138,005 A | 10/2000 | Park | |
| 6,138,009 A | 10/2000 | Birgerson | |
| 6,148,197 A | 11/2000 | Bridges et al. | |
| 6,163,701 A | 12/2000 | Saleh et al. | |
| 6,185,295 B1 | 2/2001 | Frederiksen et al. | |
| 6,185,436 B1 | 2/2001 | Vu | |
| 6,192,255 B1 | 2/2001 | Lewis et al. | |
| 6,195,532 B1 | 2/2001 | Bamburak et al. | |
| 6,208,864 B1 | 3/2001 | Agrawal et al. | |
| 6,212,372 B1 | 4/2001 | Julin | |
| 6,356,755 B1 | 3/2002 | Valentine et al. | |
| 6,356,756 B1 | 3/2002 | Koster | |
| 6,456,845 B1 | 9/2002 | Drum et al. | |
| 6,456,859 B1 | 9/2002 | Desblancs et al. | |
| 6,463,298 B1 | 10/2002 | Sorenson et al. | |
| 6,466,786 B1 | 10/2002 | Wallenius | |
| 6,505,050 B1 | 1/2003 | Brudos et al. | |
| 6,515,974 B1 | 2/2003 | Inoue et al. | |
| 6,574,481 B1 | 6/2003 | Rathnasabapathy et al. | |
| 6,603,761 B1 | 8/2003 | Wang et al. | |
| 6,603,968 B2 | 8/2003 | Anvekar et al. | |
| 6,611,516 B1 | 8/2003 | Pirkola et al. | |
| 6,628,934 B2 | 9/2003 | Rosenberg et al. | |
| 6,636,502 B1 | 10/2003 | Lager et al. | |
| 6,671,523 B1 | 12/2003 | Niepel et al. | |
| 6,684,073 B1 | 1/2004 | Joss et al. | |
| 6,693,586 B1 | 2/2004 | Walters et al. | |
| 6,738,622 B1 | 5/2004 | Stadelmann et al. | |
| 6,738,636 B2 | 5/2004 | Lielbriedis | |
| 6,764,003 B1 | 7/2004 | Martshitsch et al. | |
| 6,782,264 B2 | 8/2004 | Anderson | |
| 6,795,444 B1 | 9/2004 | Vo et al. | |
| 6,856,818 B1 | 2/2005 | Ford | |
| 6,876,860 B1 | 4/2005 | Berg et al. | |
| 6,920,487 B2 | 7/2005 | Sofer et al. | |
| 6,925,299 B1 | 8/2005 | Sofer et al. | |
| 6,961,559 B1 | 11/2005 | Chow et al. | |
| 6,963,543 B2 | 11/2005 | Diep et al. | |
| 6,968,383 B1 | 11/2005 | Heutschi et al. | |
| 6,975,852 B1 | 12/2005 | Sofer et al. | |
| 6,978,156 B1 | 12/2005 | Papadopoulos et al. | |
| 7,020,479 B2 | 3/2006 | Martschitsch | |
| 7,139,570 B2 | 11/2006 | Elkarat et al. | |
| 7,184,764 B2 | 2/2007 | Raviv et al. | |
| 7,231,431 B2 | 6/2007 | Sofer et al. | |
| 2002/0009199 A1 | 1/2002 | Ala-Laurila et al. | |
| 2002/0012351 A1 | 1/2002 | Sofer et al. | |
| 2002/0037708 A1 | 3/2002 | McCann et al. | |
| 2002/0087631 A1 | 7/2002 | Sharma | |
| 2002/0101858 A1 | 8/2002 | Stuart et al. | |
| 2002/0101859 A1 | 8/2002 | Maclean | |
| 2002/0160763 A1 | 10/2002 | Mittal et al. | |
| 2002/0187780 A1 | 12/2002 | Souissi | |
| 2002/0191575 A1 | 12/2002 | Kalavade et al. | |
| 2002/0196775 A1 | 12/2002 | Tuohino et al. | |
| 2003/0017843 A1 | 1/2003 | Noblins | |
| 2003/0050047 A1 | 3/2003 | Ala-Luukko | |
| 2003/0051041 A1 | 3/2003 | Kalavade et al. | |
| 2003/0064723 A1 | 4/2003 | Thakker | |
| 2003/0069922 A1 | 4/2003 | Arunachalam | |
| 2003/0129991 A1 | 7/2003 | Allison et al. | |
| 2003/0133421 A1 | 7/2003 | Sundar et al. | |
| 2003/0139180 A1 | 7/2003 | McIntosh et al. | |
| 2003/0208560 A1 | 11/2003 | Inoue | |
| 2003/0224795 A1 | 12/2003 | Wilhoite et al. | |
| 2003/0229791 A1 | 12/2003 | De Jong | |
| 2004/0019539 A1 | 1/2004 | Raman et al. | |
| 2004/0053610 A1 | 3/2004 | Kim | |
| 2004/0082346 A1 | 4/2004 | Skytt et al. | |
| 2004/0087305 A1 | 5/2004 | Jiang | |
| 2004/0120552 A1 | 6/2004 | Borngraber et al. | |
| 2004/0131023 A1 | 7/2004 | Auterinen | |
| 2004/0132449 A1 | 7/2004 | Kowarch | |
| 2004/0148400 A1 | 7/2004 | Mostafa | |
| 2004/0196858 A1 | 10/2004 | Tsai et al. | |
| 2004/0224680 A1 | 11/2004 | Jiang | |
| 2004/0229601 A1 | 11/2004 | Zabawskyj et al. | |
| 2004/0236836 A1 | 11/2004 | Appleman | |
| 2005/0021834 A1 | 1/2005 | Coulombe | |
| 2005/0047378 A1 | 3/2005 | Wuschke et al. | |
| 2005/0064883 A1 | 3/2005 | Heck et al. | |
| 2005/0070278 A1 | 3/2005 | Jiang | |
| 2005/0186939 A1 | 8/2005 | Barnea et al. | |
| 2005/0186960 A1 | 8/2005 | Jiang | |
| 2005/0186979 A1 | 8/2005 | McCann et al. | |
| 2005/0192007 A1 | 9/2005 | Kumar et al. | |
| 2005/0192036 A1 | 9/2005 | Greenwood et al. | |
| 2005/0215250 A1 | 9/2005 | Chava et al. | |
| 2005/0232282 A1 | 10/2005 | Silver et al. | |
| 2005/0250493 A1 | 11/2005 | Elkarat et al. | |
| 2006/0003775 A1 | 1/2006 | Bull et al. | |
| 2006/0009204 A1 | 1/2006 | Ophir | |
| 2006/0025129 A1 | 2/2006 | Wolfman et al. | |
| 2006/0052113 A1 | 3/2006 | Ophir et al. | |
| 2006/0068778 A1 | 3/2006 | Della-Torre | |
| 2006/0068786 A1 | 3/2006 | Florence | |
| 2006/0079225 A1 | 4/2006 | Wolfman et al. | |
| 2006/0079236 A1 | 4/2006 | Del Pino et al. | |
| 2006/0148459 A1 | 7/2006 | Wolfman et al. | |
| 2006/0205404 A1 | 9/2006 | Gonen et al. | |
| 2006/0211420 A1 | 9/2006 | Ophir et al. | |
| 2007/0021118 A1 | 1/2007 | Ophir et al. | |
| 2007/0049269 A1 | 3/2007 | Ophir et al. | |
| 2007/0054665 A1 | 3/2007 | Elkarat et al. | |
| 2007/0072587 A1 | 3/2007 | Della-Torre et al. | |
| 2007/0173252 A1* | 7/2007 | Jiang | 455/432.1 |
| 2007/0178885 A1 | 8/2007 | Lev et al. | |
| 2007/0232300 A1 | 10/2007 | Wolfman | |
| 2007/0259663 A1 | 11/2007 | Weintraub et al. | |
| 2008/0020760 A1 | 1/2008 | Elkarat et al. | |
| 2008/0108347 A1* | 5/2008 | Jiang | 455/433 |
| 2008/0207181 A1* | 8/2008 | Jiang | 455/414.1 |

FOREIGN PATENT DOCUMENTS

| | | |
|---|---|---|
| EP | 0899 974 A2 | 3/1999 |
| GB | 2322998 | 9/1998 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |
| WO | WO 2004/081802 | 9/2004 |
| WO | WO2004/075598 | 9/2005 |
| WO | WO2005/101857 | 10/2005 |
| WO | WO2008/012815 | 1/2008 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).
"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).
Ala-Laurila, et al., "Wireless LAN Access Network Architecture for Mobile Operators," IEEE Communications Magazine, Nov. 2001, pp. 82-89 (XP-001107810).
Brunen, M. "Roaming im Zugangsnetz Mit OWLAN uberall zu Hause sein," Net-Zeitschrift Fuer Kommunikationsmangement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LA," NTZ (Nachrichtentechnische zeitschrift), 2002, pp. 24-26 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications, Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q 764 (1999), Signaling System No. 7—ISDN User Part signaling procedures.
Q 730 (1999), ISDN User Part supplementary services.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
Universal Mobile Telecommunications System (UMTS); Multimedia Messaging Service (MMS), Functional description; Stage 2 (3GPP TS 23.140 version 4.2.0 Release 4).
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).
Technical Specification $3^{rd}$ Generation Partnership Project; Technical Specification Group Services and System Aspects; Service accessibility (Release 1999).
Signaling procedure and the Mobile Application Part (MAP) (Release 1999).
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; $3^{rd}$ Generation Partnership Project; Technical Specification Group Core Network; NAS Functions related to Mobile Station (MS) in idle mode (release 1999).
GSM 22011 service accessibility; 3 GPP TS 22.011 V3.8.0 (Sep. 2002) Technical Specification; $3^{rd}$ Generation Partnership Project; Technical Specification Group Services and System Aspects; Service accessibility (Release 1999).
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Performance objectives in the integrated services digital network application.
ITU-T Recommendation Q. 765 (1998), Signaling system No. 7—Application transport mechanism.
ITU-T Recommendation Q. 769.1 (1999), Signaling system No. 7—ISDN user part enhancements for the support of Number Portability.
3G TS 22.078 version 3.2.0 Release 1999 UMTS CAMEL.
GSM 03.48 version 8.3.0 Release 1999; ETSI TS 101 181 V8.3.0; Digital cellular telecommunications system (Phase 2+); Security Mechanisms for the SIM application toolkit; Stage 2; pp. 1-34; (Aug. 2000).
3GPP TS 29.002 version 4.9.0 Release 4; ETSI TS 129 002 V4.9,0; Digital cellular telecommunications system (Phase 2+); Universal Mobile Telecommunications System (UMTS); Mobile Application Part (MAP) specification; pp. 1-1286; (Sep. 2002).
GSM 09.60 version 7.4.1 Release 1998; ETSI EN 301 347 V7.4.1; Digital cellular telecommunications system (Phase 2+); General Packet Radio Service (GPRS); GPRS Tunnelling Protocol (GTP) across the Gn and Gp Interface; pp. 1-67; (Nov. 2000).
ITU-T—Q.705; Specifications of Signalling System No. 7; Signalling System No. 7—Signalling Network Structure; pp. 1-27; (Mar. 1993).
ITU-T—Q.761; Functional description of the ISDN User Part of CCITT Signaling System No. 7 (May 1998).
ITU-T—Q.762; General Functions of CCITT Signaling System No. 7 ISDN User Part Messages and parameters (1999).
ITU-T—Q.763; Formats and codes of CCITT Signaling System No. 7 ISDN User Part Message and parameters (1999).
ITU-T—Q.767; Application of the ISDN User Part of CCITT Signaling System No. 7 for International ISDN Interconnections (1991).
ITU-T—Q.768; Signalling Interface Between an International Switching Centre (ISC) and an ISDN Satellite Subnetwork (Oct. 1995).
Universal Mobile Telecommunications System (UMTS); Multimedia Messaging Service (MMS), Functional description; Stage 2 (3GPP TS 23.140 version 4.2.0 Release 4) (Mar. 22, 2001).
Q1214, ITU-T Intelligent Network Distributed Functional Plane For Intelligent Network CS-1. 1995.
Q1215, ITU-T Physical Plane for Intelligent Network CS-1. 1995.
Q1218 ITU-T Interface Recommendation for Intelligent Network CS-1. 1995.
3 GPP 29010; 3 GPP TS 29.010 V3.10.0; Technical Specification; $3^{rd}$ Generation Partnership Project; Technical Specification Group Core Network; Information element mapping between Mobile Station—Base Station System (MS-BSS) and Base Station System—Mobile-services Switching Centre (BSS—MSC); (Dec. 2002).
ITU-T Q.771 Series Q: Switching and Signalling—Specifications of Signalling System No. 7—Transaction capabilities application part. Functional description of transaction capabilities (Jun. 1997).

ITU-T Q.772 Series Q: Switching and Signalling—Specifications of Signalling System No. 7—Transaction capabilities application part. Transaction capabilities information element definitions (Jun. 1997).

ITU-T Q.773 Series Q: Switching and Signalling—Specifications of Signalling System No. 7—Transaction capabilities application part. Transaction capabilities formats and encoding (Jun. 1997).

ITU-T Q.774 Series Q: Switching and Signalling—Specifications of Signalling System No. 7—Transaction capabilities application part. Transaction capabilities procedures. (Jun. 1997).

ITU-T Q.775 Series Q: Switching and Signalling—Specifications of Signalling System No. 7—Transaction capabilities application part. Guidelines for using transaction capabilities. (Jun. 1997).

GSM 11.11 Digital Cellular Telecommunications System (Phase 2+); Specification of the Subscriber Identity Module—Mobile Equipment (SIM-ME) Interface. Dec. 1995, version 5.0.0.

GSM 1114 SIM Toolkit. (Dec. 1996).

IR 7320 Steering of Roaming Implementation Guidelines 0.1. May 13, 2005.

GSM 31048 Security and OTA (Oct. 2005).

GSM 23.119 3$^{rd}$ Generation Partnership Project; Technical Specification Group Core Network; Gateway Location Register (GLR)—Stage 2 (3G TS 23.119 version 0.3.0). Oct. 1999.

GSM 408 Mobile Radio Interface Network Layer (May 1996).

GSM 23122 NAS Functions Related to Mobile Station (MS) In Idle Mode. 1999.

GSM 24.008 Digital Cellular Telecommunications Systems (Phase 2+) (GSM); Universal Mobile Telecommunications System (UMTS); Mobile Radio Interface Network Layer 3 Specification, Core Network Protocols—Stage 3 (3G TS 24.008 version 3.2.1 Release 1999) Jan. 2000.

GSM 253.04 3$^{rd}$ Generation Partnership Project; Technical Specification Group Radio Access Network; UE Procedures in Idle Mode (3G TS 25.304 version 3.0.0) 1999.

3G TS 23.278 version 6.0.0, Release 6 3$^{rd}$ Generation Partnership Project; Technical Specification Group Core Network; Customized Applications for Mobile Network Enhanced Logic (CAMEL) Phase 4-Stage 2; IM CN Interworking. Dec. 2004.

GSM 360 GPRS Roaming Guidelines PRD IR.33. Apr. 3, 2003Version 3.2.0.

GSM 23060 3$^{rd}$ Generation Partnership Project; Technical Specification Group Services and System Aspects; General Packet Radio Service (GPRS); Service description; Stage 2 (Release 5). Jun. 2002.

GSM 29060 3$^{rd}$ Generation Partnership Project; Technical Specification Group Core Network; General Packet Radio Service (GPRS); GPRS Tunneling Protocol (GTP) across the Gn and Gp interface (release 1999). Mar. 2004.

GSM 23.012 3$^{rd}$ Generation Partnership Project; Technical Specification Group Core Network; Location Management Procedures (Release 4) Mar. 2001.

Q701, Specifications of Signalling System No. 7—Functional Description of the Message Transfer Part (MTP) of Signalling System No. 7. Mar. 1993.

Q702 ITU-T Specifications of Signalling System No. 7, Signalling Data Link. 1993.

Q703 ITU-T Specifications of Signalling System No. 7—Message Transfer Part. Signalling link. Jul. 1996.

Q704, Signalling network functions and messages. Specifications of Signalling System No. 7—Message Transfer Part. (Mar. 1993).

* cited by examiner

Enhanced Location-based Inbound-TR Signal Flow

In-signaling path Inbound-TR with possible Location discovery

Integrated Inbound TR and Anti-TR solution

GLR based approach

Inbound TR with anti-competitor inbound TR

CONTROLLING TRAFFIC OF AN INBOUND ROAMING MOBILE STATION BETWEEN A FIRST VPMN, A SECOND VPMN AND A HPMN

This application claims priority from U.S. Provisional Patent Application Ser. No. 60/670,914 entitled "Method and Apparatus for redirection of Inbound Roamer Traffic", filed Apr. 12, 2005 and is a continuation-in-part of U.S. patent application Ser. No. 10/635,804 entitled "Method And System For Cellular Network Traffic redirection" filed on Aug. 5, 2003 now U.S. Pat. No. 7,072,651, claiming priority from Aug. 5, 2002, and is a continuation-in-part of U.S. patent application Ser. No. 11/374,437 entitled "Method and Apparatus for Defense Against Network Traffic redirection" filed Mar. 14, 2006, and claiming priority from Mar. 14, 2005. All of those related patent applications are incorporated herein by this reference in their entirety.

BACKGROUND OF THE INVENTION

Field of the Invention

The present invention generally relates to international roamers. More specifically, the invention relates to the control of traffic from international roamers.

Common carrier mobile communication systems are deployed by different companies and network operators within almost every country around the world. Many of those network operators offer international roaming to their subscribers (or roamers) traveling abroad, and to travelers visiting their territory and using their foreign mobile telephones. Such an offering enables public mobile network subscribers the ability to use their mobile phones within public mobile networks other than their own, such as those networks present in territories other than those covered by the network to which they normally subscribe.

Over the last few years, revenues to the network operators from home subscribers have consistently declined due to increased competition and resulting in pricing pressures. On the other hand, revenues from roamers have consistently grown in the same period due to increased mobile penetration in local markets and an increase in travel. Various network operators have preferred bilateral roaming agreements ("partnerships") with each other that include more favorable roaming charges than non-partnership operators. Therefore, "preferred" visited networks are those that the home network prefers its outbound roamers to register with when traveling outside their home coverage area. Non-partner networks are "non-preferred".

Network operators can maximize their margins and the roamers can get more attractive roaming rates and services if roamers roam on their home mobile operator's preferred (or partner) networks. When the subscribers roam into visited networks from a HPMN, they may roam onto one, two or more VPMNs, one at a time, based on various criteria. These VPMNs may also include the "non-preferred" VPMN networks. In some cases even when a VPMN network is "non-preferred" to a HPMN network it gets the inbound roamers from the HPMN. These may be due to either non-coverage of "preferred" VPMNs or manual selection of an inbound roamer. This may also be due to distribution by the HPMN Traffic Redirection (TR) (or Steering of Roaming (SoR)). Hence, the roamers of the HPMN still get registered with the "non-preferred" VPMN. Sometimes, the HPMN operator can use traffic redirection techniques to control the distribution of the roamers among VPMN networks in a country so that the "preferred" VPMN network will get a very high percentage of the HPMN's roaming traffic and the "non-preferred" VPMN networks will get a low percentage of that roaming traffic. Those traffic redirections techniques used by an HPMN operator can deprive the non-preferred VPMN operators of inbound roaming revenues. Sometimes these deprived VPMN operators may have a partnership with the HPMN and may even be the "preferred" networks. Furthermore, the traffic redirection that is based on rejection error, timeout or abort techniques generates network errors to the mobile handset's radio interface. The generation of these errors compels the mobile handset to initiate again a number of registration attempts. This can overload the network interface between the HPMN and the VPMN.

In cases when there are more than two VPMN operators in a country, the radio coverage of each these VPMN operators becomes a factor for preference of one operator over the other. However, the operators are constantly improving their network coverage and hence diminishing the importance of radio coverage as the factor. Further some competing and "non-preferred" VPMN networks also deploy a form of traffic redirection at their end to retain the inbound roamers by stopping them from leaking out of their network. This leads to decrease in revenues for the other VPMN operators. It would be disadvantageous for any VPMN network operator to relinquish the control of the subscriber even when a handset is registered with it for any reason, such as failure of the SIM network list to produce registration on a preferred network.

In the previous filing (Anti-TR System), a solution was described to improve the chance of an inbound roamer getting registered successfully at a VPMN when an other than one of its preferred HPMNs is applying the TR (or SoR). While such an Anti-TR System was useful in getting an inbound roamer registered successfully with a VPMN, it is not aimed at the problem of retaining inbound roamers once they are registered with the VPMN. The viable solution present nowadays is achieved by more radio coverage and more signal strength. For newly laid out networks, improving these takes time. Even for mature networks, there are still coverage issues resulting from tiny blind spots, power control, signal interference, multi-path and shadowing effects of signals due to dynamic environments. It has been observed that inbound roamers to a country alternates among competitor networks at least 3 to 10 times a day.

Due to one or more of the above issues, there is a need in the art of traffic redirection of inbound roamers in order to retain the inbound roamers which are once registered with a VPMN operator and are either now attempting themselves or are forced to attempt to re-register with the other VPMN operators.

BRIEF DESCRIPTION OF DRAWINGS

In the drawings, the same or similar reference numbers identify similar elements or acts.

DETAILED DESCRIPTION

Figure 1:
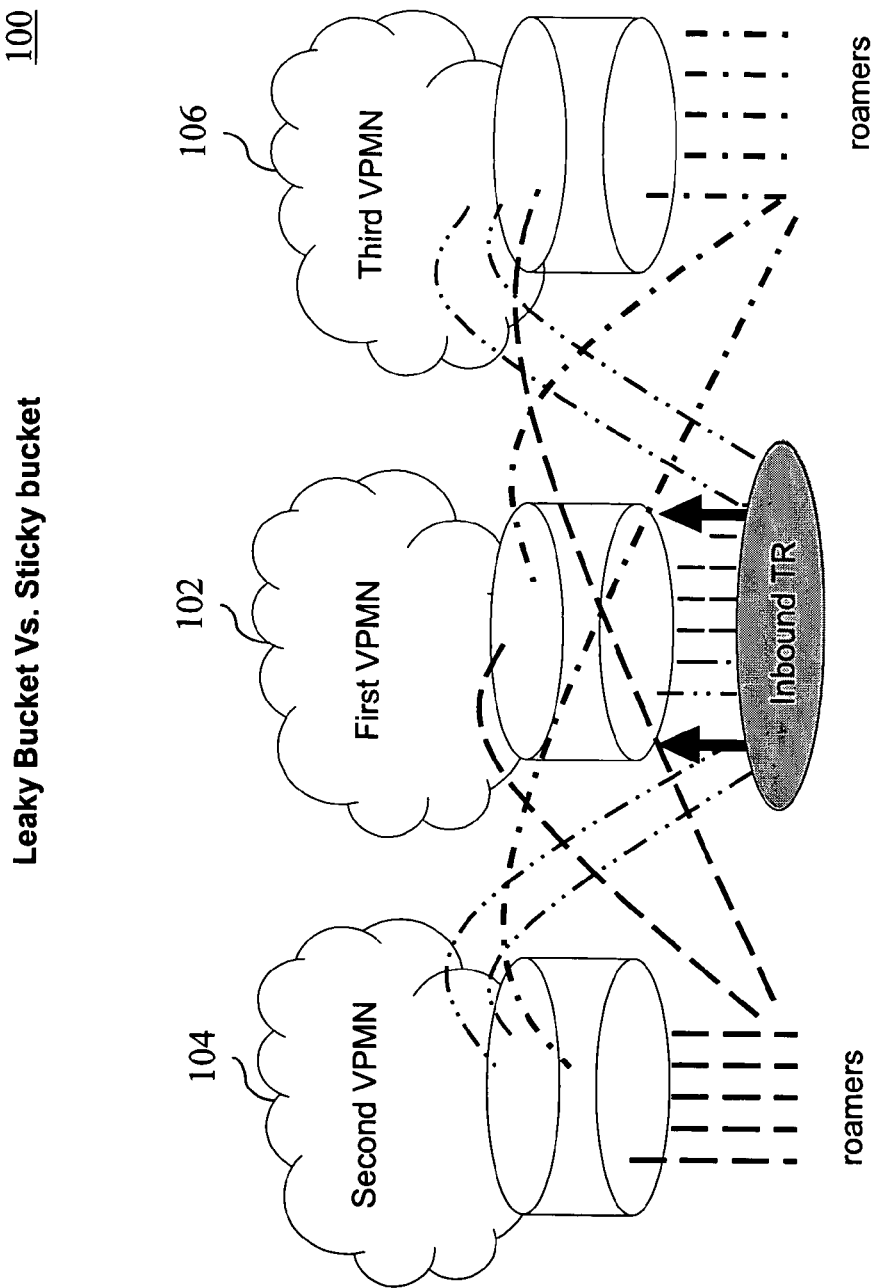
FIG. 1 shows an environment where Inbound Traffic Redirection System (ITRS) solution is implemented, in accordance with an embodiment of the invention.

A method for controlling traffic of an inbound roaming mobile station between a first Visiting Public Mobile Network (VPMN), a second VPMN and a Home Public Mobile Network (HPMN) is provided. The method includes detecting a possible change in registration of the inbound roaming mobile station upon receipt of a first registration cancellation message of one or more registration cancellation messages at the first VPMN from the HPMN. The method further includes attempting to redirect the traffic to the first VPMN by sending one or more registration messages from the first VPMN to the HPMN subsequent to receipt of the one or more registration cancellation messages from the HPMN. For each registration cancellation message received, one or more registration messages are sent within a first pre-defined interval of time (T0) till one registration message is recorded as a successful transaction. Further, for the one or more registration cancellation messages received in current attempt to redirect the inbound roaming mobile station to the first VPMN, the one or more registration messages are sent at least one of within a second pre-defined interval of time (T1) and a re-registration threshold number of times.

A system for controlling traffic of an inbound roaming mobile station between a first Visiting Public Mobile Network (VPMN), a second VPMN and a Home Public Mobile Network (HPMN) is also provided. The system includes a detection unit for detecting a possible change in registration of the inbound roaming mobile station upon receipt of a first registration cancellation message of one or more registration cancellation messages at the first VPMN from the HPMN. The system further includes a redirection unit for attempting to redirect the traffic to the first VPMN by sending one or more registration messages from the first VPMN to the HPMN subsequent to receipt of the one or more registration cancellation messages from the HPMN. For each registration cancellation message received, one or more registration messages are sent within a first pre-defined interval of time (T0) till one registration message is recorded as a successful transaction. Further, for the one or more registration cancellation messages received in current attempt to redirect the inbound roaming mobile station to the first VPMN, the one or more registration messages are sent at least one of within a second pre-defined interval of time (T1) and a re-registration threshold number of times.

The following description provides specific details for a thorough understanding and an enabling description for various embodiments of Inbound Traffic redirection System (ITRS). However, one skilled in the art will understand that the ITRS may be practiced without these details. In other instances, well-known structures and functions have not been shown or described in detail to avoid unnecessarily obscuring the description of the embodiments of the ITRS. The headings provided herein are for convenience only and do not affect the scope or meaning of the claimed invention.

Environment for Implementing ITR

FIG. 1 shows an environment 100 where the Inbound Traffic Redirection System (ITRS) is implemented, in accordance with an embodiment of the invention. The environment 100 includes a first VPMN 102, a second VPMN 104 and a third VPMN 106. Each VPMN has its own inbound roamers and in a typical scenario (for example when no VPMN preferences are set in the SIM or handset memory of an inbound roamer's mobile device), there is an even chance for each VPMN operator to get the inbound roamer's traffic. Since under typical conventions such as GSM, a handset of a roamer always looks for the last registered network when power on or regaining coverage, an initially randomly selected network will continue to be selected for an inbound roamer unless that network looses coverage. When a roamer traverses an uncovered area ("blind spot"), within a presently-registered VPMN's territory, his handset will typically switch from that present VPMN to another.

For one or more of the following reasons, the inbound roamers tend to move from one VPMN to the other. First, since every VPMN network has some blind spots (including spots that have very weak signals or no signals at all), automatic switching to VPMN's offering coverage would, if not corrected by some type of Steering of Roaming technology, result in an even distribution of inbound roamers across all competing VPMN operators. For most of the networks, there are coverage issues resulting from tiny blind spots, power control, signal interference, multi-path fading and shadowing effects of signals due to dynamic environments that would cause such an even distribution. These reasons propel the inbound roamer to change the VPMN network. Some inbound roamers will lose to other operators while others come from competing operators.

For example, in FIG. 1, the inbound roamers from the second VPMN 104 are leaking to both first VPMN 102 and third VPMN 106, as shown by dotted lines. Similarly, the inbound roamers from the third VPMN 106 are leaking to first VPMN 102 and second VPMN 104. Hence, for both second VPMN 104 and third VPMN 106 buckets for their inbound roamer are leaking. The ITRS is deployed in first VPMN 102 to ensure and increase the probability of inbound roamers continuing to stay with first VPMN 102 once they have registered with the network. In this way, if a "leaky bucket" is used to illustrate the inbound roamers of second VPMN 104 and third VPMN 106, with some of their inbound roamers leaking to other VPMNs, then the ITRS solution of the first VPMN 102 puts a patch on its "leaky bucket" to reduce leakage so to create a "sticky bucket" of inbound roamers. In other words, the "sticky bucket" ensures that any inbound roamer which is once registered with first VPMN 102 stays with the same VPMN. One or more possible ways to achieve the objective are described later in conjunction various embodiments explained with corresponding figures.

System for Implementing Basic Inbound Traffic Redirection Mechanism

Figure 2:
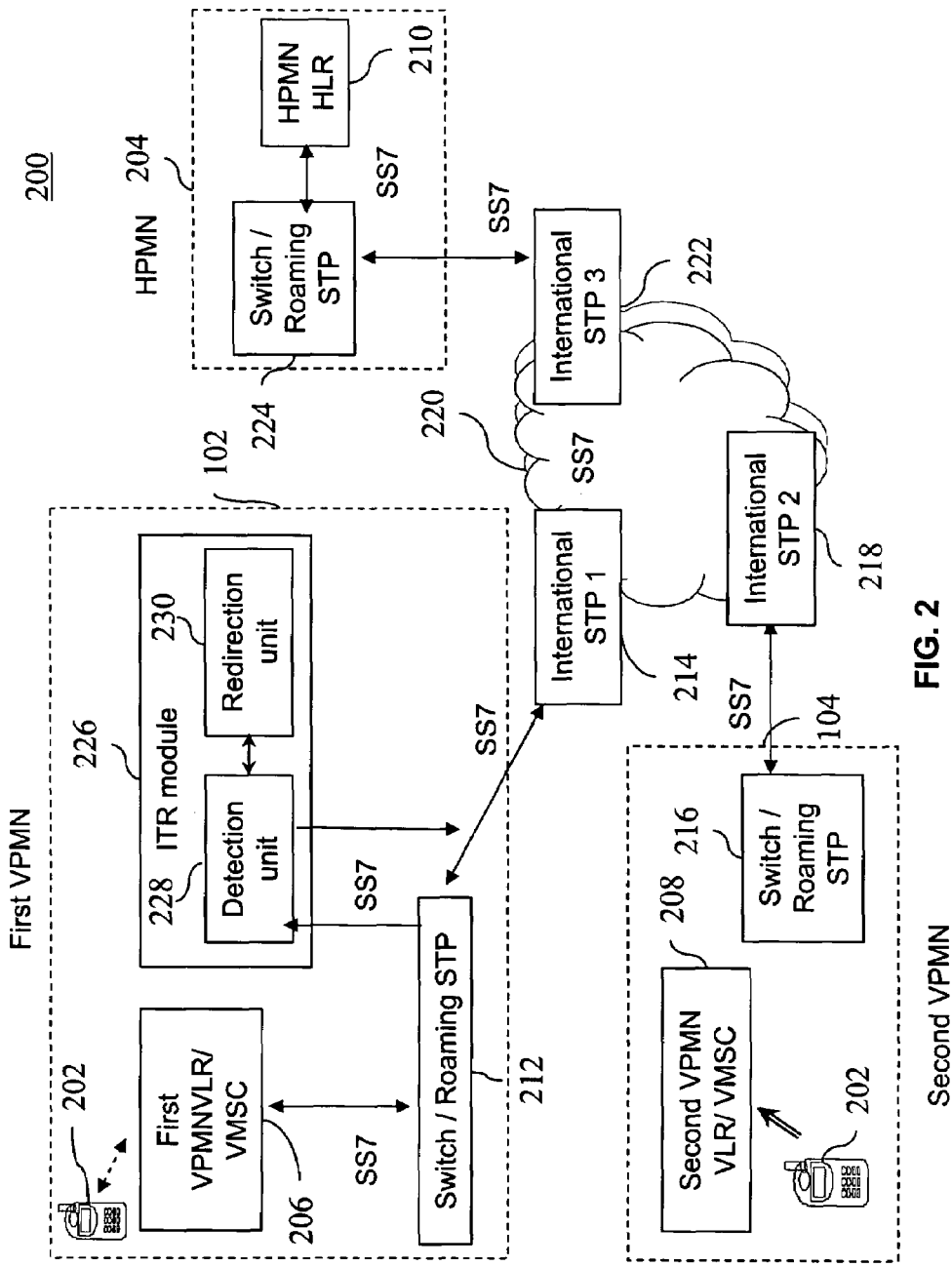
FIG. 2 represents a system for controlling traffic of an inbound roaming mobile station between a first Visiting Public Mobile Network (VPMN), a second VPMN and a Home Public Mobile Network (HPMN), in accordance with an embodiment of the invention.

FIG. 2 represents a system 200 for controlling traffic of an inbound roaming mobile station 202 between first VPMN 102, second VPMN 104, and a Home Public Mobile Network (HPMN) 204, in accordance with an embodiment of the invention. The inbound roaming mobile station 202 (or a roamer) is initially registered with a VPMN operator at a first VPMN VLR 206 in first VPMN 102, while it is roaming from the HPMN 204. However, in some cases inbound roaming mobile station 202 attempts to (or is forced to attempt) register to another VPMN operator at a second VPMN VLR 208 in second VPMN 104. In one embodiment of the invention, first VPMN VLR 206 is integrated with a VMSC in first VPMN 102. Also second VPMN VLR 208 is integrated a VMSC in second VPMN 104. Notwithstanding, both the VPMN VLRs and the VMSCs may have different logical addresses. Subscriber profile data corresponding to the inbound roaming mobile station 202 is stored in a HPMN HLR 210 located in HPMN 204.

The roaming signaling corresponding to inbound roaming mobile station 202 at the first VPMN 102 is routed between a switch/roaming STP 212 and an international STP 1 214. The roaming signaling corresponding to inbound roaming mobile station 202 at the second VPMN 104 is routed between a switch/roaming STP 216 and an international STP 2 218. The signaling between HPMN 204 and first VPMN 102, and between HPMN 204 and second VPMN 104 are carried using SS7 signaling architecture 220 involving an international STP 3 222 connected to switching/roaming STP 224 in HPMN 204. The signals exchanged between different networks are TCAP (including MAP, CAP and the like) based signals. In another embodiment of the invention, the signals exchanged are SCCP based routing signals.

The inbound roaming mobile station 202 attempts to register with second VPMN 104 even though it is already registered with the first VPMN 102 due to one or more of the following reasons. Firstly, the inbound roaming mobile station 202 may attempt to change the VPMN network in case there is weak signal strength or a loss of coverage in first VPMN 102. Secondly, the inbound roaming mobile station 202 may be selecting the second VPMN 104 due to new available technology e.g. GPRS or 3G in second VPMN 104. In one embodiment of the invention, second VPMN 104 attempts to redirect the traffic of inbound roaming mobile station 202 to itself. The attempt by a VPMN operator to redirect the traffic of an inbound roamer to its own network is hereinafter referred to as an Inbound Traffic Redirection (ITR) attempt.

In another embodiment of the invention, inbound roaming mobile station 202 is redirected by an operator in HPMN 204 in order to steer inbound roaming mobile station 202 to a "preferred" (or even a "non-preferred") network operator in second VPMN 104. In other words, a traffic redirection (TR) is preformed by an operator in HPMN 204 to redirect the traffic of inbound roaming mobile station 202 to some other network operator in second VPMN 104 even though the operator in HPMN 204 may have roaming relationship with first VPMN 102. In yet another embodiment of the invention, this network reselection may also be due to preferred PLMN timer on the inbound roaming mobile station 202 indicating preference of second VPMN 104 over first VPMN 102. The steering of inbound roaming mobile station 202 deprives the first VPMN 102 of the revenues from the inbound roamer.

The system 200 includes an ITR module 226 that monitors the traffic between HPMN 204, and first VPMN 102 and thereafter provides necessary one or more messages to attempt to redirect the traffic to first VPMN 102. In one embodiment of the invention, ITR module 226 is deployed by first VPMN 102 to counter the TR attempt by the operator in HPMN 204 and an ITR attempt by second VPMN 104. The ITR module 226 includes a detection unit 228 and a redirection unit 230. In one embodiment of the invention, detection unit 228 monitors/probes the signals exchanged between switch 212 in first VPMN 102 and international STP 1 214. This is referred to as passive monitoring.

In another embodiment of the invention, ITR module 226 actively intercepts the signaling from switch (or roaming STP) 212 or from the international STP 1 214 in the in-signaling path mode. Further, in this case, switch 212 is configured to assist in exchange of first registration cancellation message, one or more registration messages, and one or more registration cancellation messages between HPMN 204, and first VPMN 102. Hence, the monitoring or probing of the traffic redirection attempt is performed in two modes, either by passive monitoring or active monitoring of the signals. In one embodiment of the invention, all signals exchanged through switch 212 are SCCP/TCAP based signals.

Such "active" monitoring is hereinafter referred interchangeably as in-signaling mode. In the in-signaling mode ITR module 226 is deployed on roaming SS7 path by configuring switch 212 (or roaming STP) to route international roaming SCCP traffic through ITR module 226. In an exemplary routing, primary routing of the incoming international SCCP traffic from international STP 1 214 destined to E164 VPMN VLR 206 is configured to go through ITR module 226. However, secondary routing is kept to VPMN VLR 206. This is done in order to provide a redundant path for routing of traffic in case of failure of ITR module 226. Similarly, primary routing of any outgoing international SCCP traffic destined to E214 address of inbound roaming mobile station 202 from HPMN 204 is configured to go through ITR module 226. The secondary routing however goes to international STP 3 222. It will be apparent to a person skilled in the art, that different routing methods using any combination thereof can be used without affecting the working of the system or the method.

The E214 is a numbering plan (NP) used for delivering mobility management related messages in GSM networks. The E.214 number is derived from the IMSI of a roaming mobile station. E.214 numbers are composed of two parts. The first, the E.164 part, is made up of a country code followed by the network code. The second part of the number is made from the MSIN part of the IMSI which identifies an individual subscriber. E.214 numbers are routed separately from E.164 numbers since they are marked with a different Numbering Plan Indicator (NPI), however, it is possible to reuse Global Title (GT) analysis tables used in E.164 numbers everywhere except for the final destination network of the message.

Inbound Traffic Redirection Routing Using TT

In case where the addresses of VPMN VLR and VMSC are identical, SSN can be used to separate the routing. It will be apparent to a person skilled in the art that alternative routing options are possible depending on type of network elements in first VPMN 102 and second VPMN 104. For example, to avoid looping the traffic redirection can be performed either using translation types (or tables) (TT) or using MTP routing involving international STP Signal Point Code (SPC) and Switching/Roaming SPC, depending on the network setup in VPMN(s). In another example, an operator in first VPMN 102 could perform MAP analysis and only redirect Cancel Location message from E164 messages from international STP 1

214 through ITR module 226 to reduce significantly the in-signaling load. Considering the former technique of using the TT, the switch 212 and the ITR module 226 are configured for both incoming and outgoing international SCCP signaling messages. For example, in case of an incoming message at the switch 212 with TT as 0, Called party (CdPA) is not own and the NP is E.214, the DPC is set as ITR module 226 and the destination TT as 32. Similarly, in case the CdPA is VPMN VLR 206 and the NP is E.164 with TT as 0, the DPC is set to be ITR module 226 and the destination TT as 32. This means any incoming E164 message at the switch 212 is directed to the ITR module 226 first. In case of an outgoing message from the switch 212 with the TT as 32 and CdPA is not own and the NP is E.214, the DPC is set as international STP 1 214 and destination TT as 0. Further, in case with TT as 32 and CdPA as VPMN VLR 206 and the NP is E164, the DPC is also set to VPMN VLR 206 and destination TT as 0. The routing indicator (RI) of SCCP CdPA in all these cases can remain unchanged (e.g. on Global Title (GT)).

Inbound Traffic Redirection Routing Without Using TT

Considering the second technique of using MTP routing, switch 212 is configured to send an incoming message with NP as E.214 and CdPA as not own to DPC at ITR module 226. Also in case the CdPA is VPMN VLR 206 with NP as E 164, the DPC is changed to ITR module 226. Routing configuration for an own network (first VPMN 102) destined outgoing message from ITR module 226 to the switch 212 sets the DPC to VPMN VLR 206 with RI as SSN/unchanged. Similarly, for an international (HPMN) destined outgoing message from ITR module 226 to the switch 212, the DPC is set to international STP 1 214 with RI remaining as GT. Based on different incoming and outgoing messages from switch 212, the ITR module 226 sends different messages as one or more registration messages to attempt to redirect the traffic of inbound roaming mobile station 202 to first VPMN 102.

In case when none of the above conditions are satisfied, then all incoming SCCP messages may be relayed back to switch 212 (or the roaming STP) or VPMN VLR 206 respectively depending on whether the TT type or MTP routing is used. In the above described methods, SCCP is relayed rather than TCAP. However, it will be apparent to a person skilled in the art, that a similar flow can also be defined for TCAP based relay. In this case, new transaction will be initiated by ITR module 226 for each self-initiated fake LUP message and each time a new mapping will be established to relate the new originating transaction ID to the original originating transaction ID.

Basic Inbound Traffic Redirection Signal Flow

Figure 3:
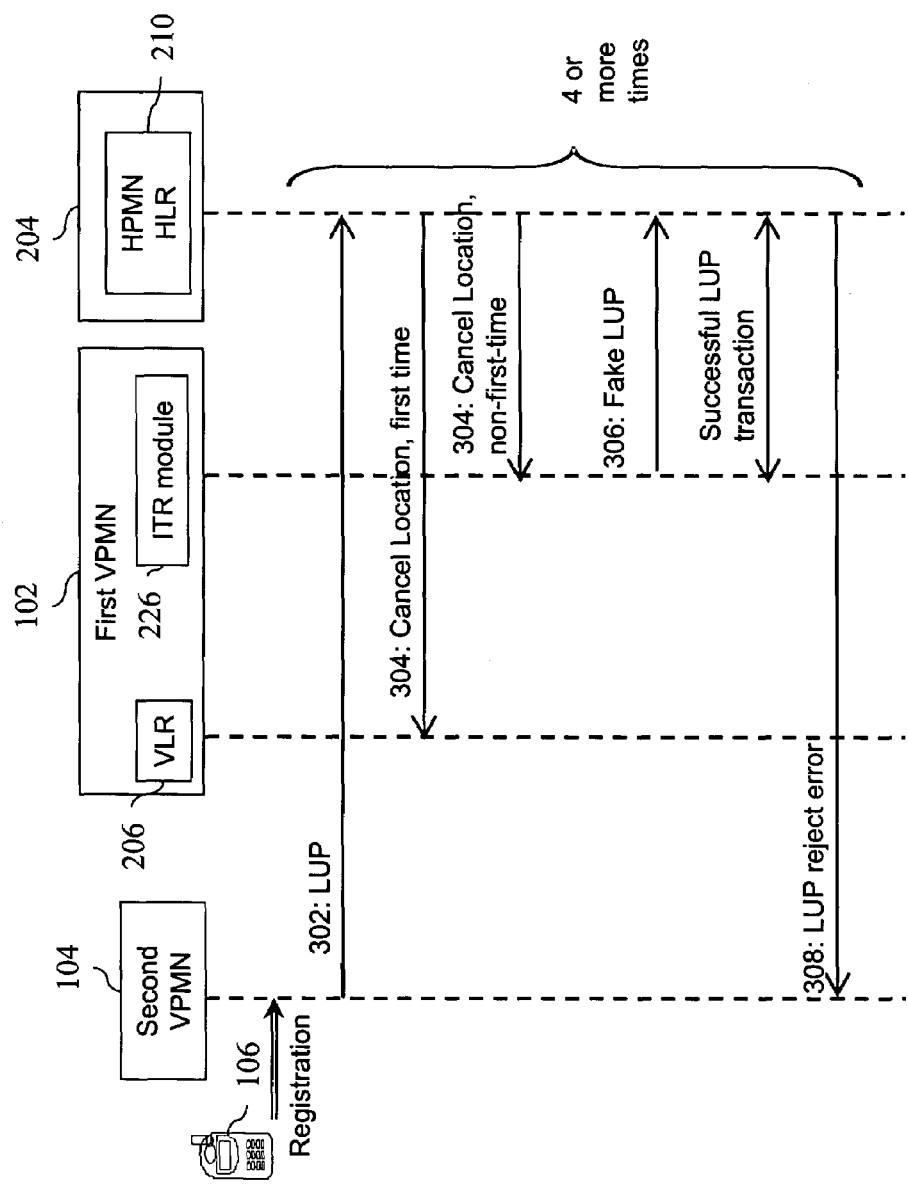
FIG. 3 represents a flow diagram for implementing Inbound Traffic redirection (ITR) between the first VPMN, the second VPMN and the HPMN, in accordance with an embodiment of the invention.

FIG. 3 represents a flow diagram for implementing inbound traffic redirection between first VPMN 102, second VPMN 104 and HPMN 204, in accordance with an embodiment of the invention. Detection unit 228 in ITR module 226 detects a possible change in registration of inbound roaming mobile station 202 upon receipt of a first registration cancellation message of one or more registration cancellation messages at first VPMN 102 from HPMN 204. In one embodiment of the invention, the possible change in the registration of inbound roaming mobile station 202 is inferred when a Location Update (LUP) message 302 being sent a first registration message from second VPMN 104 to HPMN 204. This LUP 302 is sent by second VPMN 104 after inbound roaming mobile station 202 attempts to (or is forced to attempt to) register with second VPMN 102. Hence, detection unit 228 can deduce inbound roaming mobile station 202 is attempting to register with second VPMN 106 when there is no new registration message received from the first VPMN 102 also detection unit 228 detects the receipt of the one or more registration cancellation messages at first VPMN 102. In one embodiment of the invention, the first registration cancellation message is a Cancel Location message 304 sent from HPMN HLR 210 to cancel the registration of inbound roaming mobile station 202 with first VPMN 102. The first registration cancellation message of the one or more registration cancellation messages is sent directly to the first VPMN VLR 206 while the subsequent registration cancellation messages are tapped at ITR module 226.

It will be apparent to a person skilled in the art, that the Cancel Location 304 process from the HPMN HLR 210 that is started from a new location update received at the HPMN HLR 210 is independent of the status of the Location Update process at HPMN HLR 210. In other words, as soon as inbound roaming mobile station 202 changes to second VPMN 104, the first VPMN 102 should get the Cancel Location message 304 independent of the status of the Location Update process at HPMN HLR 210. Thereafter, redirection unit 230 attempts to redirect the traffic to first VPMN 102 by sending one or more registration messages from first VPMN 102 to HPMN 204 subsequent to receipt of one or more registration cancellation messages from HPMN 204.

For each registration cancellation message detected, one or more registration messages are sent by the ITR module 226 in the first VPMN 102 within a first pre-defined interval of time (T0) till one registration message is recorded as a successful transaction. It will apparent to a person skilled in the art, the different functions are associated with the detection unit 228 and redirection unit 230 only for exemplary purposes. Notwithstanding, any functional property of any of the two will be hereinafter associated with ITR module 226. In other words, any function which is to be performed by either detection unit 228 or redirection unit 230 is alternatively capable of being performed by ITR module 226 alone.

ITR module 226 can be an integration of detection unit 228 and redirection unit 230, and is deployed in first VPMN 102. In one embodiment of the invention, for each registration cancellation message detected, the one or more registration messages are Location Update messages (LUP) 306 from first VPMN 102. These LUP messages are fake location update (LUP) messages. However, last of these fake LUP messages 306 is recorded as successful transaction unless the time T0 is expired and all are sent with a pre-defined interval of time (T0). In one embodiment of the invention, the time interval T0 is less than or equal to the time required for completing location update process from the second VPMN 104 at HPMN HLR 210. The successful LUP transaction implies exchange of other necessary messages, such as MAP ISD and MAP ISD ACK (according to the underlying protocol) also to be successful exchanged between first VPMN 102 and HPMN HLR 210.

The one or more registration messages are sent using one or more GT for each of the Cancel Location message received. In one embodiment of the invention, the GT is used of the first VPMN VLR 206. In another embodiment of the invention, the GT is selected from one or more GT(s) associated with the first VPMN 102. When a new location update from the ITR module 226 in the first VPMN 102 occurs before/during the successful completion of the previous location update from the second VPMN 104, the HPMN 204 (or HPMN HLR 210) will send a TCAP/MAP abort or system failure message to the second VPMN 104. As a result, a network failure of the location registration at the second VPMN 104 is generated by the second VPMN 104 towards the inbound roaming mobile station 202. Hence, redirection unit 230 exchanges the one or more registration messages 306 corresponding to each of one or more registration cancellation messages 304 received from HPMN 204. The one or more registration cancellation messages 304 are sent subsequent to each registration message 302 sent by inbound roaming mobile station 202 after an error is generated at inbound roaming mobile station 202. Examples of network messages from HPMN 204 to the second VPMN 104 resulting in a radio message to the inbound roaming mobile station indicating the network failure, but not limited to, are MAP U/P ABORT, MAP_CLOSE, TCAP-abort, and system failure depending on HLR implementation in HPMN.

The error messages received in incoming messages on the error interface are mapped onto equivalent messages on the radio interface according to 3GPP 29010. Table 1 shows a snapshot of the mapping of some of these messages from the network interface (29.002) to the radio interface (24.008) with corresponding error codes for each interface.

These are examples only and are not intended as being an exhaustive list or representative.

TABLE 1

| Error code | 24.008 MM (Location Updating Reject) | 29.002 MAP Update Location response | Error code |
|---|---|---|---|
| # 2 | IMSI unknown in HLR | Unknown subscriber | # 1 |
| # 11 | PLMN not allowed | Roaming not allowed: PLMN not allowed | # 8 |
| # 12 | LA not allowed | — | |
| # 13 | Roaming not allowed in thisLA | — | |
| # 15 | No suitable cells in location area | — | |
| # 11 | PLMN not allowed | Operator determined barring | # 8 |
| # 3 | Illegal MS | — | |
| # 6 | Illegal ME | — | |
| # 17 | Network failure | System Failure | # 34 |
| # 17 | Network failure | Unexpected data value | # 36 |
| # 17 | Network failure | MAP U/P ABORT | |
| # 17 | Network failure | MAP_NOTICE | |
| # 17 | Network failure | MAP_CLOSE | |

For example, in case, the error in network interface "System Failure" (with error code 34) (29.002), then its equivalent error on the radio interface (24.008) is "Network Failure" (error code #17), and received at inbound roaming mobile station 202, and thereafter inbound roaming mobile station 202 waits for around 20 or 15 seconds before another try on the same network. Similarly, other 24.008 error messages have their equivalent 29.002 error messages.

When inbound roaming mobile station 202 encounters such an error for a few (e.g. 4) times, it selects an alternative network (including the same network again). The new network is either selected from a new scan or from an existing scan. The existing scan has a possibility of tracking weak signals from first VPMN 102. When inbound roaming mobile station 202 gets a Network Failure (error code 17), it retries, by sending the registration message 302, at most equal to an expected number of times for existing network (second VPMN 104) before selecting an alternative network. In one embodiment of the invention, the expected number of times is four. Each retry attempt generates Cancel Location 304 for first VPMN 102. This is received at the ITR module 226, which immediately sends a corresponding fake LUP message 306 (i.e. one or more registration messages). If the roamer was attempting a competing VPMN network in the same country as first VPMN 102, the fake LUP process eventually results in retry for an alternative network (including the second VPMN 104) by inbound roaming mobile station 202. Also, in case of blind spots (i.e. weak signal areas) in the first VPMN 102, any delay to the registration process of second VPMN 104 provides a chance for inbound roaming mobile station 202 to come back to first VPMN 102 again including regaining signal strength at first VPMN 102. Once one or more fake LUP messages sent by the ITR module 226 in first VPMN 102 to the HPMN 204 successfully, prior to the completion of registration message sent from second VPMN 104, HPMN 204 sends a reject message to second VPMN 104. In one embodiment of the invention, a LUP reject error 308 is sent as the reject message to second VPMN 104 by HPMN 204. Hence, the process of exchange of messages from 302 to 308 is repeated 4 or more times before inbound roaming mobile station 202 tries for an alternative network, including second VPMN 104.

In case first VPMN 102 is not found in the current list of available PLMN(s) of inbound roaming mobile station 202, different (maybe discontinuous) PLMN search schemes are used in order to minimize access time while maintaining battery life. For example, the search is prioritized in favor of BCCH carriers which have a high probability of belonging to an available and allowable PLMN. This provides first VPMN 102 that has deployed ITR module 226 a better chance to be found and registered again by inbound roaming mobile station 202. The longer time and the higher the number of fake LUP attempts ITR module 226 makes, the better is the chance for inbound roaming mobile station 202 to get registered to first VPMN 102.

In another embodiment of the invention, similar exchange of signals is performed in case of GPRS. The system 200 in this embodiment includes an SGSN associated with second VPMN 104 and another SGSN associated with first VPMN 102. ITR module 226 monitors (actively and passively) exchange of Cancel Location messages as the one or more registration cancellation messages are sent to the SGSN in first VPMN 102 instead of first VPMN VLR 206. Further, the SGSN in first VPMN 102 sends one or more fake GPRS LUP messages.

Referring back to FIG. 3, as mentioned earlier, the one or more Fake LUP messages 306 for each registration cancellation message from HPMN 204 to the first VPMN 102 are required to be sent within the pre-defined interval of time (T0). T0 is the interval that a location update process takes to complete at the HPMN HLR 210. All the fake location updates from ITR module 226 for all registration cancellation messages from HPMN 204 to the first VPMN 102 in a current ITR attempt however also need be sent within a second pre-defined interval of time (T1) and/or a re-registration threshold number of times. The T1 time interval is a re-registration timer. The value of the re-registration timer indicates the time left to perform an ITR attempt for an inbound roaming mobile station. In another embodiment of the invention, all of the fake LUP messages 306 for the current ITR attempt are sent at most equal to the re-registration threshold number of times of a re-registration counter. The re-registration counter indicates number of registration attempts made by inbound roaming mobile station 202 for second VPMN 104 while the ITR module 226 is deployed in first VPMN 102. The re-registration threshold of the re-registration counter provides an upper limit to the number of fake LUP messages 306 to be sent by ITR module 226. In one embodiment of the invention, the T1 is equal to the multiplication of the sum of maximum interval between the one or more fake LUP messages 306 (after the network failure #17) and maximum interval to select an alternative network (including the second VPMN 104) for a location update attempt by the number of competitor network operators in the country.

For example but without limitation, if the number of competitor operators in a country is 5, the interval to retry the same network is 45 sec and the interval to try an alternative network is 15 sec, then T1=5*(45+15)=300 sec. The interval to retry the same network can be in the range of 45 sec to 150 sec and the interval to try an alternative network can be in the range of 15 sec to 30 sec. In an exemplary case, the value of T1 can be within a range of 60 sec to 300. In another embodiment of the invention, the T1 is equal to an expiration threshold. The expiration threshold indicates the time when the re-registration counter is reset so as to treat any further Cancel Location from HPMN HLR 210 as a new ITR sequence.

Initially the re-registration counter is set to zero and the re-registration timer is set to the expiration threshold. In one embodiment of the invention, the re-registration threshold for the re-registration counter is set to (N−1)*4, where N is the number of competitor operator networks in the country where ITR module 226 is deployed. Four is selected as inbound roaming mobile station 202 tries for a total of four times for the same network (i.e. second VPMN 104) on receiving error code #17, based on GSM 408 or 3GPP 24.008. For the reason that the ITR attempt has to be completed before the completion of the Location Update process for second VPMN 104, the value of N is selected as 2, assuming there are two networks in that country. This also increases chances of inbound roaming mobile station 202 getting back to first VPMN 102.

In one embodiment of the invention, the HPMN HLR 210 issues Cancel Location 304 to the first VPMN VLR 206 only after completing Location Update with second VPMN 104. In this case, ITR module 226 first sends the fake LUP message using its own GT. Thereafter the HPMN HLR 210 issues a Cancel Location to second VPMN 104. However, in this case, inbound roaming mobile station 202 will not receive any information or notifications until any MO activity. Hence the ITR module will not receive further registration cancellation messages from the HPMN HLR 210 and it cannot perform further fake location updates. In such a case, since there is no point to perform ITR attempts on such a HPMN HLR, the HPMN HLR 210 can be blacklisted. The blacklist can be periodically emptied just to cater for a future change in configuration of the HPMN HLR 210. For such a HPMN HLR when it is not blacklisted, ITR module 226 sends one or more response messages on behalf of inbound roaming mobile station 202 in response to receipt of one or more request messages from the HPMN HLR 210 when the one or more registration cancellation messages are received after completion of location update process at second VPMN 104. In one embodiment of the invention, the one or more request messages are including but not limited to, MAP PSI from HPMN 204, MAP PRN from HPMN 204 as a result of an incoming call to the inbound roaming mobile station's number and a MAP Forward SMS as a result of an incoming SMS to the inbound roaming mobile station's number from an SMSC. ITR module 226 sends an Absent Subscriber message as the response message on behalf of inbound roaming mobile station 202.

Further a redirection counter for all inbound roamers is defined. A redirection counter for each HPMN at a configurable interval of time (e.g. 1 hour) is also defined. In an embodiment of the invention, a redirection limit for the redirection counter at the configurable interval of time can be defined for each inbound roaming mobile station in HPMN. The system can refer to these types of counters on attempts and success per home network or visited network are for special application logic to control the inbound TR process and results. One example of such special application logic is to control the distribution of traffic accepted from the variety of HPMNs. Especially in situations when capacity is at a premium, such logic can be used to help ensure that a visited network serves roamers from its preferred partners with priority, or manages priority among multiple foreign networks according to rules. In one embodiment of the invention, one or more of the redirection counters are incremented when the ITR attempt is successful or failed.

In case such a re-registration timer is expired and yet the re-registration counter remains less than 5, it indicates a possibility that inbound roaming mobile station 202 is stuck in second VPMN 104. The stuck can be due to the handset issues. However, the re-registration counter would be greater than 1 if it is the handset issue. In case the counter remains at 1, the HLR would only issue the Cancel Location to first VPMN 102 after the completion of location update with second VPMN 104 in which case the HPMN HLR 210 is blacklisted for a while from further ITR attempts.

Management of Counters

Figure 4:
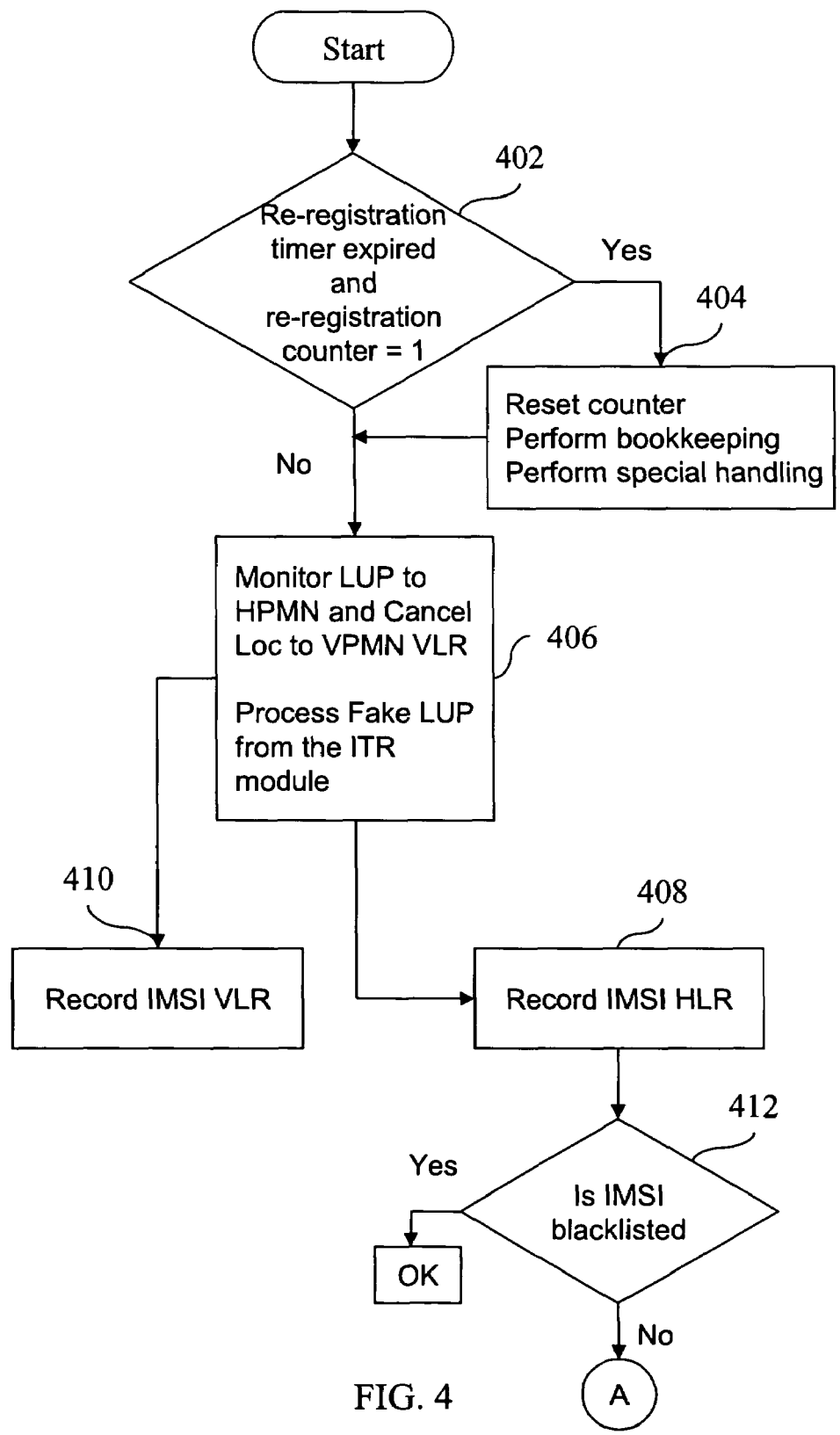
FIGS. 4 and 5 represent a flowchart depicting various application logics to be checked before applying special handling techniques and providing VAS in combination with the ITR attempt, in accordance with an embodiment of the invention.
Figure 5:
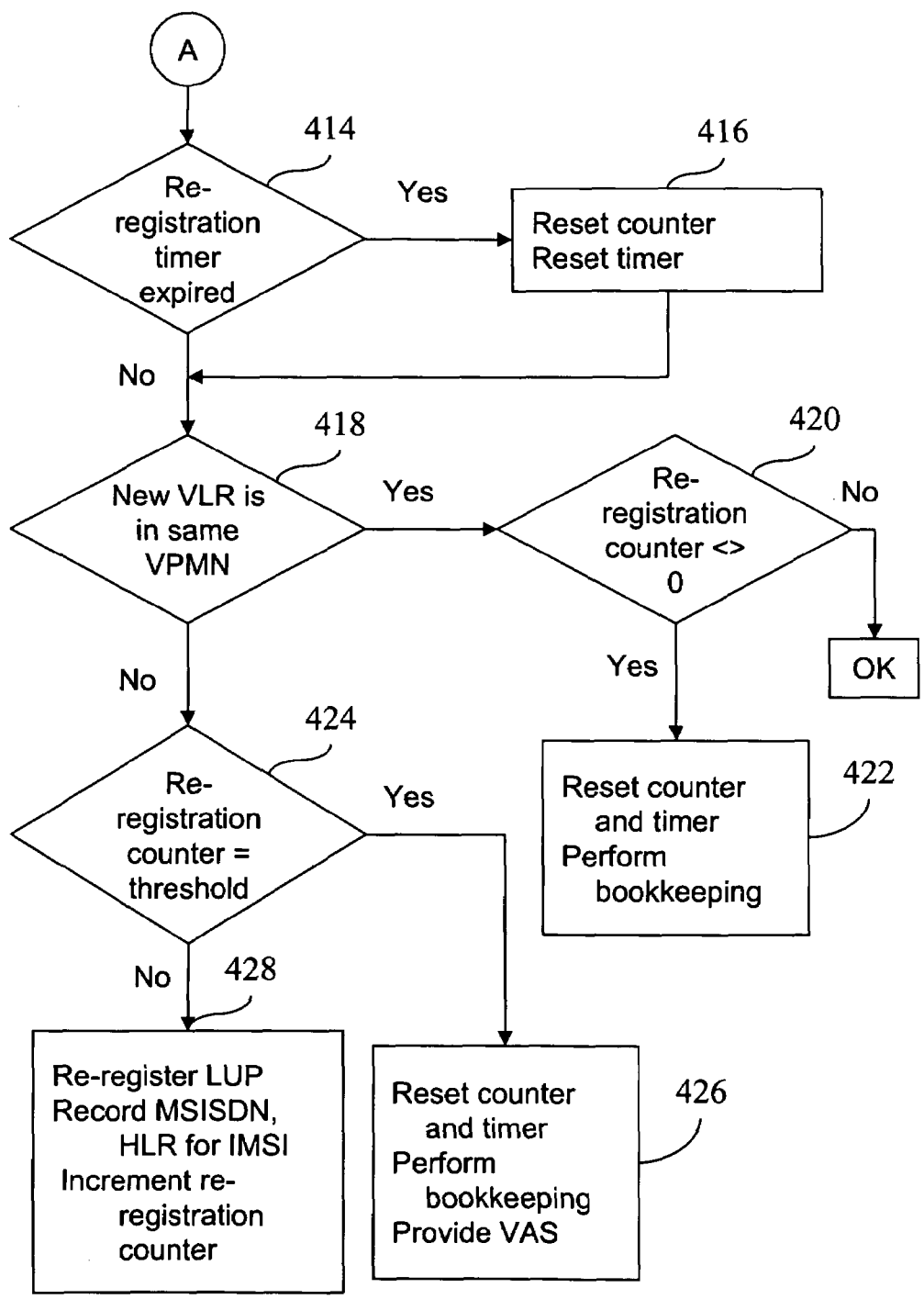

FIGS. 4 and 5 represent a flowchart depicting various sorts of application logic that can be checked before applying special handling techniques and providing VAS in combination with the ITR attempt, in accordance with an embodiment of the invention. The re-registration counter and the re-registration timer (as introduced in conjunction with FIG. 3) are used to apply one or more special handling techniques to inbound roaming mobile station 202. In other words, both the counter and the timer values are used to decide whether the special handling and the VAS are to be provided. At step 402, it is checked if the re-registration timer is expired and the re-registration counter is equal to 1. If yes, then at step 404, the re-registration counter is reset and statistical bookkeeping is done. The statistical bookkeeping can include changing values of one or more redirection counters. Also special handling techniques may be performed.

Thereafter, at step 406, ITR module 226 monitors the LUP message to the HPMN HLR 210 and Cancel Location message to the first VPMN VLR 206. Further, also at step 406, the fake LUP message is processed by ITR module 226. ITR module 226 issues the fake LUP using own GT as the VLR, VMSC and SCCP CgPA on the same IMSI or inbound roamer again. ITR module 226 completes the fake LUP transaction itself. At step 408, for every successful fake LUP message, MSISDN and HLR of IMSI of inbound roaming mobile station 202 are recorded.

At step 410, for each LUP message from own network (first VPMN 102), ITR module 226 records VLR and IMSI. Here the VLR and IMSI for inbound roaming mobile station 202 are captured irrespective whether the LUP message is successful or not. At step 412, ITR module 226 checks whether the IMSI is blacklisted. If there exists an error message returned in response to ITR module's fake LUP message indicating unknown subscriber, RNA, ODB barring for roaming, RNA in location area (due to restriction, regional service subscription, national roaming and the like), the IMSI will be blacklisted for subsequent fake LUP messages by ITR module 226 until the IMSI is registered in first VPMN 102 again. If blacklisted, then ITR module 226 can abandon the ITR attempt.

If not, then at step 414, the re-registration timer is checked whether it is expired. If expired, then at step 416, both the re-registration counter and the re-registration timer are reset. For each Cancel Location Message from HPMN HLR 210 on an IMSI to a VPMN VLR including the Cancel Location message sent to ITR module 226 for its fake LUP message, ITR module 226 first records the HLR for the IMSI and it checks via the previous recorded LUP message of the IMSI from second VPMN 104 to HPMN HLR 210 if the IMSI was registering/registered in a new VLR in the same VPMN (i.e., first VPMN 102).

However, if the re-registration timer is not expired, then at step 418, the ITR module 226 or other system elements can check if the new VLR is in the same VPMN. In case it is the same VLR, and the re-registration timer for the IMSI is expired (i.e. at zero), then at step 420, it is checked if the re-registration counter is not equal to zero. If equal to zero, then ITR attempt is abandoned.

If the re-registration counter is not zero, then at step 422, the total redirection counter is incremented and the re-registration counter for the IMSI is set to zero and re-registration-timer for the IMSI is set to the expiration threshold again. In other words, statistical bookkeeping is performed.

In case the output of step 418 is a different VLR in same VPMN, ITR module 226 at step 424, checks whether the re-registration counter is equal to threshold. In case the re-registration counter is equal to the re-registration threshold following can be performed at step 426:
1. Increment the total redirection counter.
2. Increment the total redirection counter per HPMN.
3. Increment the total redirection counter per IMSI per interval.
4. Reset the re-registration-counter to zero and the re-registration-timer for the IMSI to the expiration threshold.
5. The ITR module 226 optionally performs some value added services.

However, in case the re-registration counter is not equal to threshold, then at step 428, ITR module 226 re-registers the LUP, records the MSISDN, HLR for the IMSI and increments the re-registration counter.

Enhanced Location-based Inbound Traffic Redirection

Figure 6:
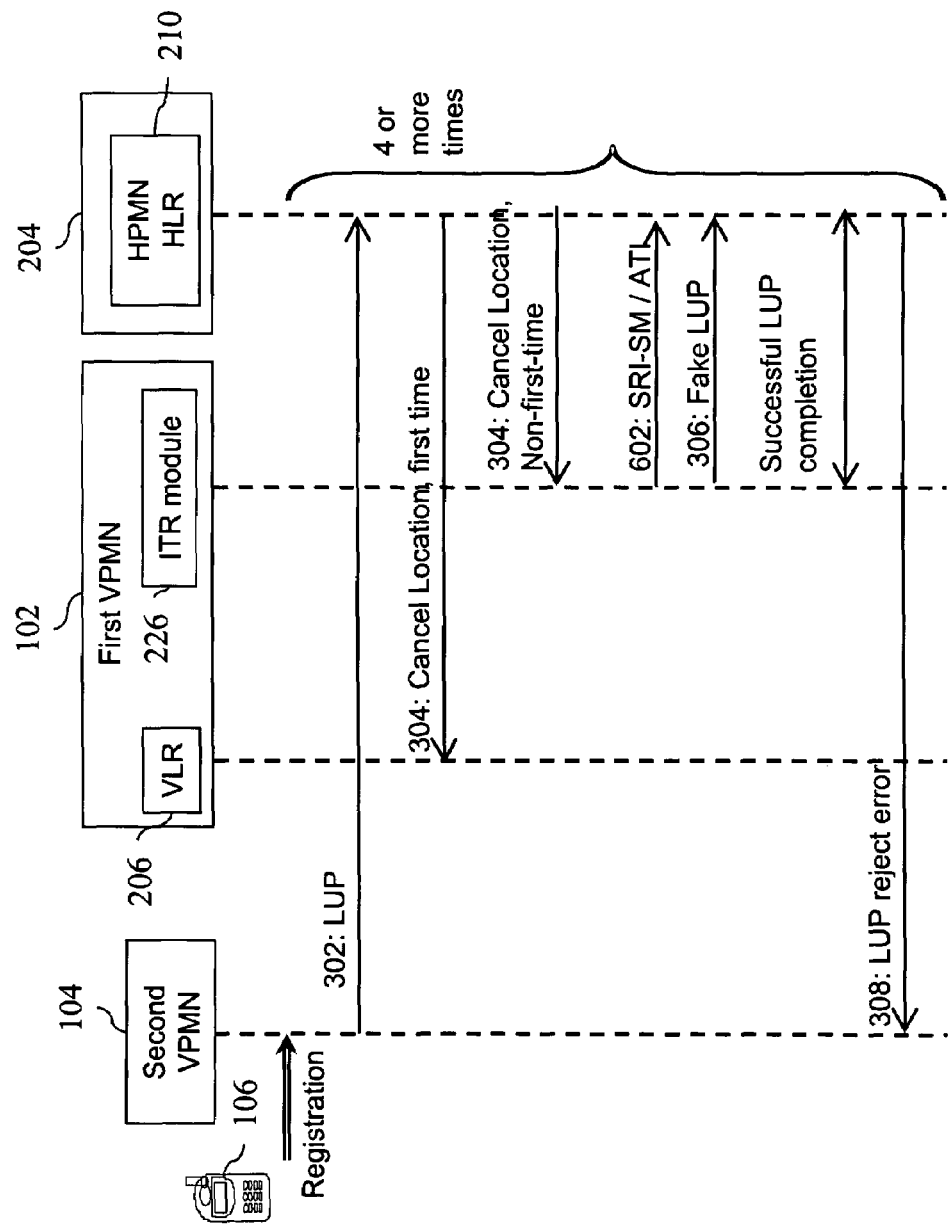
FIG. 6 represents a flow diagram for implementing Enhanced Location based ITR between the first VPMN, the second VPMN and the HPMN, in accordance with an embodiment of the invention.

FIG. 6 represents a flow diagram for implementing Enhanced Location based ITR between first VPMN 102, second VPMN 104 and HPMN 204, in accordance with an embodiment of the invention. In case inbound roaming mobile station 202 leaves the country deploying the ITR module 226, the ITR module continues to send the fake LUP messages to the HPMN HLR 204. To avoid such a situation, the enhanced location based ITR is performed. Referring to FIG. 6, detection unit 228 in ITR module 226 detects a possible change in registration of inbound roaming mobile station 202 upon receipt of the first registration cancellation message (Cancel Location 304) at first VPMN 102 from HPMN 204. The possible change in the registration of inbound roaming mobile station 202 is inferred when Location Update (LUP) message 302 being sent the first registration message from second VPMN 104 to HPMN 204. This LUP 302 is sent by second VPMN 104 after inbound roaming mobile station 202 attempts to (or is forced to attempt to) register with second VPMN 102. Hence, detection unit 228 can deduce inbound roaming mobile station 202 is attempting to register with second VPMN 102. Further, detection unit 228 detects the receipt of the one or more Cancel Location message 304 as registration cancellation messages at first VPMN 102. The registration cancellation message is a sent from HPMN HLR 210 to cancel the registration of inbound roaming mobile station 202 with first VPMN 102. The first registration cancellation message of the one or more registration cancellation messages is sent directly to first VPMN VLR 206 while the subsequent registration cancellation messages are tapped at ITR module 226. Further, as mentioned earlier, Cancel Location 304 from the HPMN HLR 210 that is started by the inbound roaming mobile station's registration attempt at the second VPMN 104 is independent of the status of the Location Update process at HPMN HLR 210.

In one embodiment of performing the enhanced location based ITR attempt, ITR module 226 sends a search request message concurrently with each of the one or more fake LUP messages 306 after receipt of the Cancel Location message 304 from HPMN 204 and before relaying the same to first VPMN VLR 206. The search request message is sent to a last know VMSC of inbound roaming mobile station 202 to collect location area information of inbound roaming mobile station 202. In one embodiment of the invention, the search request message is a Search MS (a MAP message) sent concurrently with the fake LUP message 306. The information received after sending the Search MS indicates whether inbound roaming mobile station 202 is still under the coverage of first VPMN 102 deploying ITR module 226. In another embodiment of the invention, the search request message is a Page MS message sent concurrently with the fake LUP message 306 and before relaying the Cancel Location 304 to first VPMN VLR 206. The Search MS is sent in both active and passive monitoring mode, while the Page MS is sent in the active monitoring (i.e., in-signaling path mode). Page MS only pages inbound roaming mobile station 202 in the last (or current) known location area, while the Search MS searches all location areas of the last (or current) known VMSC. However with both the messages, if there are errors to the search request message, then the network and the country where the inbound roaming mobile station 202 is currently at cannot be identified.

To avoid this problem, another embodiment of performing location based ITR attempt is now described. Referring to FIG. 6, after the first Cancel Location 304 is received at first VPMN VLR 206, the ITR module 226 sends a routing request immediately prior to sending the fake LUP message 306 to HPMN HLR 210. In one embodiment of the invention, the routing request is a SRI-SM message 602. This is the most preferred embodiment. In another embodiment of the invention, the routing request is an SRI message. In yet another embodiment of the invention, the routing request is an ATI message. The SRI-SM message is sent on MSISDN of inbound roaming mobile station 202. In one embodiment of the invention, ITR module 226 sends the fake LUP message 306 after receipt of an SRI-SM ACK message. In another preferred embodiment of the invention, ITR module 226 sends the fake LUP message 306 immediately after sending the SRI-SM message without waiting for the SRI-SM ACK message. If the HPMN HLR 210 takes a VMSC (or VLR) location of a roamer immediately from a new network location update even before it is completed, then the SRI-SM ACK message will return a VMSC. After knowing the VMSC of inbound roaming mobile station 202 and when the re-registration counter of the IMSI of inbound roaming mobile station 202 is at threshold, then ITR module 226 does not attempt ITR but, in one embodiment, provide VAS to inbound roaming mobile station 202.

The VAS is provided when the ITR attempt fails and the response to the routing request returns a competitor network. Examples of VAS may include, but are not limited to, sending a "Winback" SMS or a "Thank You and come back again" SMS. However, if the HPMN HLR 210 does not return anything or returns an error to a SRI-SM request, then the immediate fake LUP message 306 still beats racing condition with the HPMN HLR's 210 current location update process. In one embodiment of the invention, ITR module 226 blacklists an HLR associated with HPMN 204 for a pre-defined time interval in absence of a response or in presence of an error message (e.g. system failure or unexpected data value or data missing etc) to the routing request (SRI-SM) for a configurable number of times from HPMN 204.

Since HLR typically will provide a higher priority to Location Update message than the routing request message, if the fake LUP is sent too soon after SRI-SM, the SRI-SM might even return the fake LUP's sender GT (i.e. ITR module GT) as the VMSC address. In this case, ITR can increment a configurable delay interval (a few milliseconds) for the next SRI-SM and fake LUP sequence until the total delayed interval reaches a threshold. The increment for each fake LUP in an ITR attempt need not be all the same, for example, the first increment is 0, the next increment is 2 ms, the next one just 1 ms etc. The threshold can be in the range 20 ms-200 ms. When the threshold of total delayed interval is reached for the HLR and this has happened a number of times, the HLR can be blacklisted from further SRI-SM messages. When a HPMN HLR 210 is blacklisted from further SRI-SM query before each fake LUP message 306, it implies, when Cancel Location 304 on inbound roaming mobile station 202 is received from the HPMN HLR 210, and if the HLR is blacklisted due to above reason, ITR module 226 just issues fake LUP messages 306 without any routing request (SRI-SM) prior to it.

In case there is a VMSC returned from the SRI-SM ACK as a response to the SRI-SM message, the ITR module 226 determines whether the VMSC in second VPMN 104 is a non-ITR attempting network after applying some application logics of pre-defined criteria on the response. Thereafter, subsequent fake LUP messages including the follow-on one if the fake LUP message is issued after the SRI-SM ACK will not be sent to HPMN HLR 210. In other words, the ITR attempt on the departing inbound roaming mobile station 202 will not be abandoned. Examples of some application logics of pre-defined criteria that determine that the VMSC returned from SRI-SM request is a non-ITR candidate include, but not limited to, the following:

1. The VMSC is in a different country from that of first VPMN 102.
2. The VMSC is in a blacklist VPMN network in the same country as of first VPMN 102. For example, when two VPMN networks have some kind of agreements (e.g. a merger or a friendly deal) not to do an ITR to each other.
3. The VMSC is in a blacklist VPMN network in any country that is different from that of first VPMN 102. For example, when two VPMN networks have some kind of agreements (e.g. a merger or a group alliance) not to do an ITR attempt against each other.
4. The VMSC belongs to a network in a country (same or different country from that of first VPMN 102) that satisfies some statistical criteria including, but not limited to, the following:
    a. The network already exceeds its allocated threshold of the ITR attempts within a configurable interval. For example, the interval may be infinite.
    b. The network already exceeds its threshold of the inbound TR success within a configurable interval. For example, the interval may be infinite.
    c. The network is forbidden for an ITR attempt within some kinds of time bands.
    d. The network exceeds its percentage of distribution for all ITR attempts or success. For example, a limit could be set that no ITR attempts/successes for a HPMN network more than a certain percentage of all the ITR attempts or success.

Referring again to FIG. 6, one or more Fake LUP messages 306 for each registration cancellation message from HPMN 204 to the first VPMN 102 are required to be sent within the first pre-defined interval of time (T0). T0 is the interval that location update process takes to complete at the HPMN HLR 210. All the fake location updates from the ITR module 226 for all registration cancellation messages from HPMN 204 to the first VPMN 102 in an ITR attempt however also need be sent within the second pre-defined time interval T1 and/or within the re-registration threshold. The T1 time interval is a re-registration timer. The value of the re-registration timer indicates the time left to perform an ITR attempt for a departing roamer. In another embodiment of the invention, all the one or more fake LUP message 306 are sent in an ITR attempt also at most equal to the re-registration threshold number of times of a re-registration counter. The re-registration counter indicates number of registration attempts made by inbound roaming mobile station 202 for second VPMN 104 while the ITR module 226 is deployed in first VPMN 102. The re-registration threshold of the re-registration counter provides an upper limit to the number of fake LUP messages 306 to be sent by ITR module 226.

When a new location update from the ITR module 226 in the first VPMN 102 occurs before/during the successful completion of the previous location update from the second VPMN 104, the HPMN 204 (or HPMN HLR 210) will send a TCAP/MAP abort or system failure message to the second VPMN 104. In one embodiment of the invention, a LUP reject error 308 is sent to second VPMN 104 by HPMN 204 As a result, a network failure of the location registration at the second VPMN 104 is generated by the second VPMN 104 towards the inbound roaming mobile station 202. Examples of network messages from HPMN 204 to the second VPMN 104, resulting a radio message to the inbound roaming mobile station indicating the network failure, but not limited to, are MAP U/P ABORT, MAP_CLOSE, TCAP-abort, and system failure depending on HLR implementation in HPMN.

Special Handling

The current ITR attempt on a departing roamer may be performed or abandoned based on fulfillment of certain criteria. In one embodiment of the invention, ITR module 226 may abandon the ITR attempt if inbound roaming mobile station 202 is found to be in a manual mode. In another embodiment of the invention, ITR module 226 abandons the ITR attempt in case inbound roaming mobile station 202 attempts to register with second VPMN 104 greater than an expected number of times. Exemplary value of the expected number of times is four.

In yet another embodiment of the invention, ITR module 226 abandons the ITR attempt in case inbound roaming mobile station 202 attempts to register with second VPMN 104 greater than a registration threshold. For example, if inbound roaming mobile station 202 is stuck after 4 or more retries before any timer or threshold are reached and the stuck-interval exceed a certain limit, then ITR module 226 blacklists the IMSI of inbound roaming mobile station 202. The blacklist can just be made per trip-based. In this embodiment of the invention, the registration threshold is the limit for the stuck-interval and it is a configurable parameter.

In one embodiment of the invention, the ITR attempt may be limited to blacklist and white-list based on network criteria (e.g. complaining partner network) and roamer profile (e.g. usage, explicit complaint from an inbound roamer). If inbound roaming mobile station 202 goes back to home country but the ITR module 226 is not aware as no VMSC is returned to the SRI-SM query in the ITR attempt, then inbound roaming mobile station 202 keeps trying to re-register at HPMN or a home country network until re-registration limit in form of the registration threshold is reached.

In another embodiment of the invention, if ITR module 226 is not aware that inbound roaming mobile station 202 is out to a third country because no VMSC is returned to the SRI-SM query in an inbound TR attempt, the ITR attempt will continue until the re-registration limit is reached. In another embodiment of the invention, if inbound roaming mobile station 202 continues to try to register with second VPMN 104 (because a VMSC is returned to the SRI-SM query in an inbound TR attempt) right after more than the expected number of (4) fake location updates in the ITR attempt, ITR module 226 abandons the current ITR attempt on inbound roaming mobile station 202. The departing roamer is deduced to be in a manual mode.

In still another embodiment of the invention, ITR module 226 abandons the ITR attempt when inbound roaming mobile station 202 is found to be present in non-coverage area of first VPMN 102. The non-coverage area can be deduced if inbound roaming mobile station 202 continues to try to register with second VPMN 104 (because a VMSC is returned in the SRI-SM query in an inbound TR attempt) in the ITR attempt and there are some other competitor networks in between in the ITR attempt, ITR module 226 abandons the current ITR attempt on inbound roaming mobile station 202.

If inbound roaming mobile station 202 is in manual mode but ITR module 226 does not know because no VMSC is returned in the SRI-SM query in the ITR attempt, inbound roaming mobile station 202 will try to re-register at the same operator until re-registration limit is reached. Further, if inbound roaming mobile station 202 is detected to be in a non-coverage area of first VPMN 102 (deploying the ITR module 226) in the country but ITR module 226 does not know because no VMSC is returned in the SRI-SM query in the ITR attempt, inbound roaming mobile station 202 will try to re-register different operators in the country until re-registration limit is reached.

In another embodiment of the invention, ITR module 226 defines a maximum network counter for the ITR attempt to control the maximum number of competitor networks against which fake location updates are issued. This is done if the new network location of inbound roaming mobile station 202 is known through the VMSC returned to the SRI-SM query in the ITR attempt. Similarly, ITR module 226 defines a maximum timer for the ITR attempt for a network to control the maximum duration for which the fake location updates are issued for the network in an ITR attempt.

In yet another embodiment of the invention, ITR module 226 defines a global redirection limit for an inbound roamer at a configurable interval. This may be per country or per HPMN-based. Also, ITR module 226 defines a redirection limit for all inbound roamers of a particular HPMN or country at a configurable interval of time. In another embodiment of the invention, ITR module 226 defines thresholds and timers for re-registration on per VPMN VLR/VMSC or cell basis (if known), since the VPMN knows better its own coverage at particular VMSC/VLR or cell.

In another embodiment of the invention, ITR module 226 defines a configuration distribution control profile among HPMNs of inbound roamers. The configuration distribution control profile supports in decision of performing the ITR attempt. Also ITR module 226 activates the configuration distribution control profile on the HPMNs at different time bands. The configuration distribution control profile is defined based on the following (but not limited to the following) one or more parameters:

1. Unique inbound roamers: For example, no more than 15% of ITR attempts or success to be made on unique roamers from Vodafone™ United Kingdom (UK).
2. Inbound TR attempts: For example, no more than 15% of ITR attempts of total ITR attempts to be made on inbound roamers from Vodafone™ United Kingdom.
3. Inbound TR success: For example, no more than 15% of ITR success of total successful ITR attempts to be made on inbound roamers from Vodafone™ United Kingdom.

The one or parameters described above help in deciding redirection of roamers. For example, inbound roamers from China Mobile™ will get X % of redirection and from China Unicom™ will get the Y % of redirection. Exemplary values of X and Y may be 15 and 75. These values are chosen by an operator in first VPMN 102.

In one embodiment of the invention, these one or more parameters in the configurable distribution control profile are measured by a configurable counter. In other words, the distribution measure can be done for the configurable counter of the corresponding count in each of the above one or more parameters. For example, if the distribution control is on inbound TR attempts and the configurable counter is set to 10, then the percentage will be measured for every 10 ITR attempts. Hence, the ITR module can define success rate as:

Total ITR success counter/Total redirection counter

In another embodiment of the invention, if HPMN HLR has fraud control in such a way that it discards a location update from ITR module or simply new registrations of inbound roaming mobile station during another location update of the station, ITR module 226 blacklists HPMN HLR 210 from future ITR attempts.

I. Location-based Inbound Traffic Redirection for Another Country

In another embodiment of the invention, the enhanced location-based ITR mechanisms can even be applied to perform network selection for departing roamers going to a new VPMN in another country. In case, inbound roaming mobile station goes back to the home country, the ITR is abandoned. Although it is possible to select networks in the home country when there is national roaming for the HPMN network of the roamer in the home country. In this embodiment of the invention, the ITR module attempts to perform the ITR to a third VPMN when the attempt to perform the ITR to the first VPMN is unsuccessful. This can be useful for group alliance, i.e., the third VPMN is a preferred network to the first VPMN in comparison to the second VPMN being a non-preferred network to the first VPMN. For example, if inbound roaming mobile station 202 is from Vodafone™ UK (HPMN 204) and is departing from Orange™ Netherlands (first VPMN 102) is known to be trying to register at Smartone™ Hong Kong (the new VPMN), the ITR module 226 is deployed at Orange Netherlands may still perform ITR attempt until the inbound roaming mobile station 202 is registered at Create a Simple Life (CSL™) Hong Kong (third VPMN). This is done assuming that CSL HK is a preferred partner of Orange Netherlands. The ITR module may also choose to perform the ITR to another network in case CSL HK has no coverage or inbound roaming mobile station 202 is in manual mode.

Hence, all the special handling mechanisms defined for ITR mechanism within the country can be similarly applied for the ITR outside the country. In an exemplary embodiment of the invention, Orange Netherlands that is deploying ITR module 226 for inbound roamers departing the country, may define a distribution control for Hong Kong such that CSL HK can get 70% of departing roamers from its network to Hong Kong, Smartone HK gets 10% and the rest 20% may go to other networks in Hong Kong, such as, People or Sunday. In another exemplary embodiment, the ITR module may define a maximum timer or maximum network counter for each country when the ITR mechanism is applied to departing roamers to third countries.

Location-recovery-based Inbound Traffic Redirection Using PSI

Figure 7:
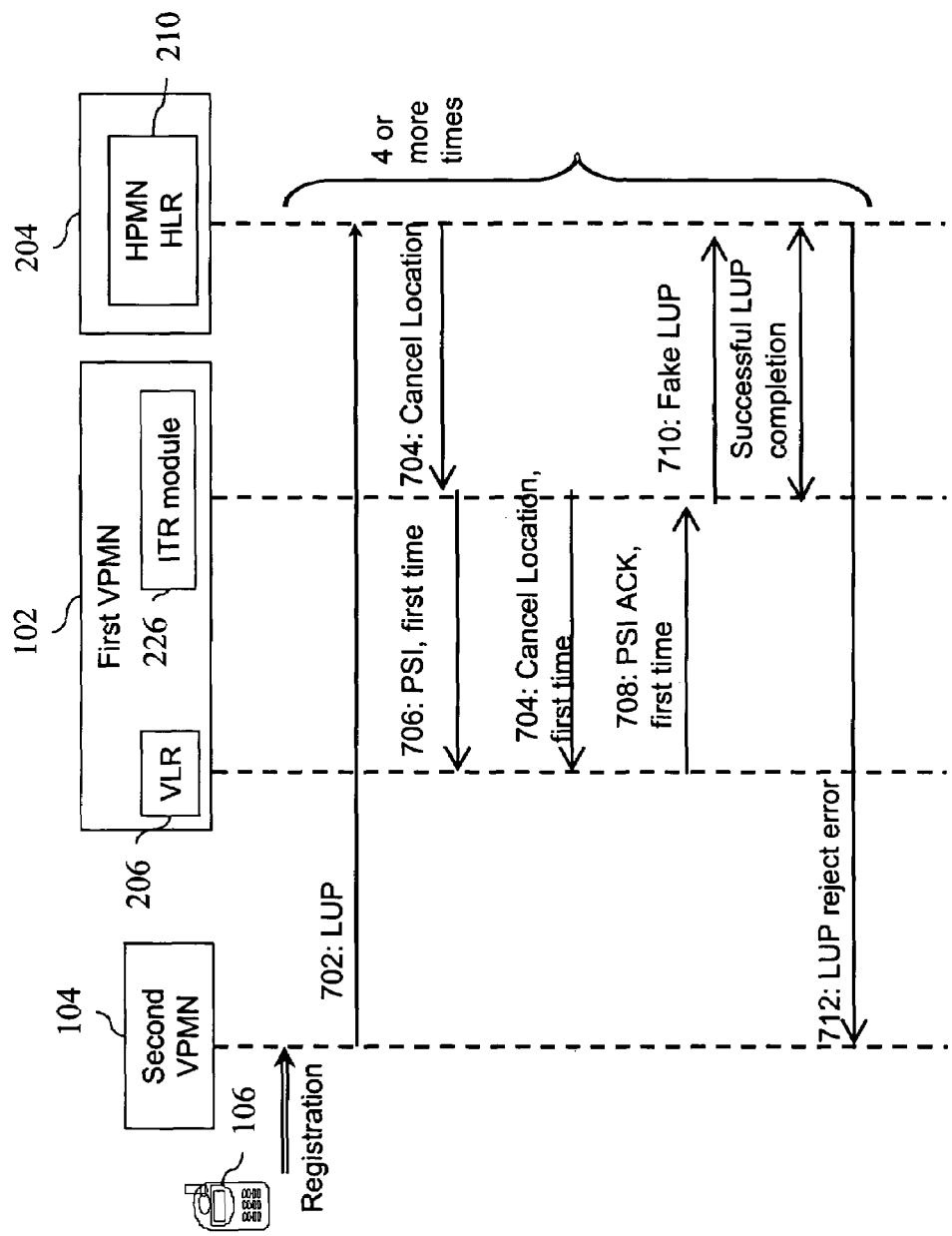
FIG. 7 represents a flow diagram for implementing Location Recovery based ITR between the first VPMN, the second VPMN and the HPMN, in accordance with an embodiment of the invention.

FIG. 7 represents a flow diagram for implementing Location Recovery based ITR between first VPMN 102, second VPMN 104 and HPMN 204, in accordance with an embodiment of the invention. In case inbound roaming mobile station 202 leaves the country deploying the ITR module 226, ITR module 226 attempts to identify the location of inbound roaming mobile station 202. Detection unit 228 in ITR module 226 detects a possible change in registration of inbound roaming mobile station 202 upon receipt of a Cancel Location message 704 at first VPMN 102 from HPMN 204. The possible change in the registration of inbound roaming mobile station 202 is inferred when a Location Update (LUP) message 702 being sent the first registration message from second VPMN 104 to HPMN 204. This LUP 702 is sent by second VPMN 104 after inbound roaming mobile station 202 attempts to (or is forced to attempt to) register with second VPMN 102. The registration cancellation message is a sent from HPMN HLR 210 to cancel the registration of inbound roaming mobile station 202 with first VPMN 102. Hence, detection unit 228 can deduce inbound roaming mobile station 202 is attempting to register with second VPMN 102.

The first Cancel Location 704 received is held at ITR module 226. After receiving the Cancel Location 704, redirection unit 230 identifies a blind spot in first VPMN 102 based on a reply message in response to sending a subscriber information message to a VLR associated with inbound roaming mobile station 202. The subscriber information message is sent before relaying the first registration cancellation message (Cancel Location 704) from HPMN 204 to first VPMN VLR 206 in first VPMN 102. In one embodiment of the invention, redirection unit 230 sends a PSI message 706 as the subscriber information message to first VPMN VLR 206. The PSI message 706 is a MAP based signal. In one embodiment of the invention, first VPMN VLR 206 pages inbound roaming mobile station 202 in anticipation of a reply from inbound roaming mobile station 202 indicating a current location and cell in first VPMN 102. In another embodiment of the invention or there is no reply from the paging, first VPMN VLR 206 simply returns the last known cell location where the roamer was at. All these variations intend to gain a rough idea of the blind spots where the roamers were about to be lost at the first VPMN 102. After sending the PSI message 706 to first VPMN VLR 206 the ITR module 226 relays the Cancel Location message 704 even before it receives a PSI ACK message 708 indicating the current location of inbound roaming mobile station 202.

However, PSI ACK will be processed independently of current ITR. The current ITR attempt will continue normally as described earlier in active monitoring mode. Further, as mentioned earlier, Cancel Location 704 from the HPMN HLR 210 is independent of the Location Update process at HPMN HLR 210. Then, ITR module 226 continues the ITR attempt by sending fake LUP messages 710, which on successful completion with HPMN HLR 210, create the Network Failure error (#17) at inbound roaming mobile station 202, forcing it to attempt for an alternative network. Thereafter, HPMN HLR 210 sends a LUP reject error 712 generating the Network Failure error (#17) at inbound roaming mobile station 202. Other examples of messages indicating the network failure, but not limited to, are MAP U/P ABORT, MAP_CLOSE, TCAP-abort, and system failure depending on HLR implementation.

In one embodiment of the invention, in case first VPMN 102 has deployed technologies to provide location and mobile drop-off information (e.g. through Abis or A-interface in active monitoring) of the current roamer in real time, then ITR module 226 is also capable to provide information of where inbound roaming mobile station 202 is leaking to competitor networks.

In another embodiment of the invention, the PSI message 706 is issued after the success of an ITR attempt on the inbound roaming mobile station 202. In this case, after the departing roamer has successfully registered with the first VPMN 102, the ITR module 226 can issue a separate PSI message to get the cell location information where the roamer is currently at. This will also provide the first VPMN 102 a rough idea where the roamer was about to be lost to the competitor networks. Both the PSI message sent before the ITR attempt and after the ITR success provide the first VPMN a rough idea where the departing roamer was about to be lost to a competitor network.

Inbound Traffic Redirection with Anti-traffic Redirection

Figure 8:
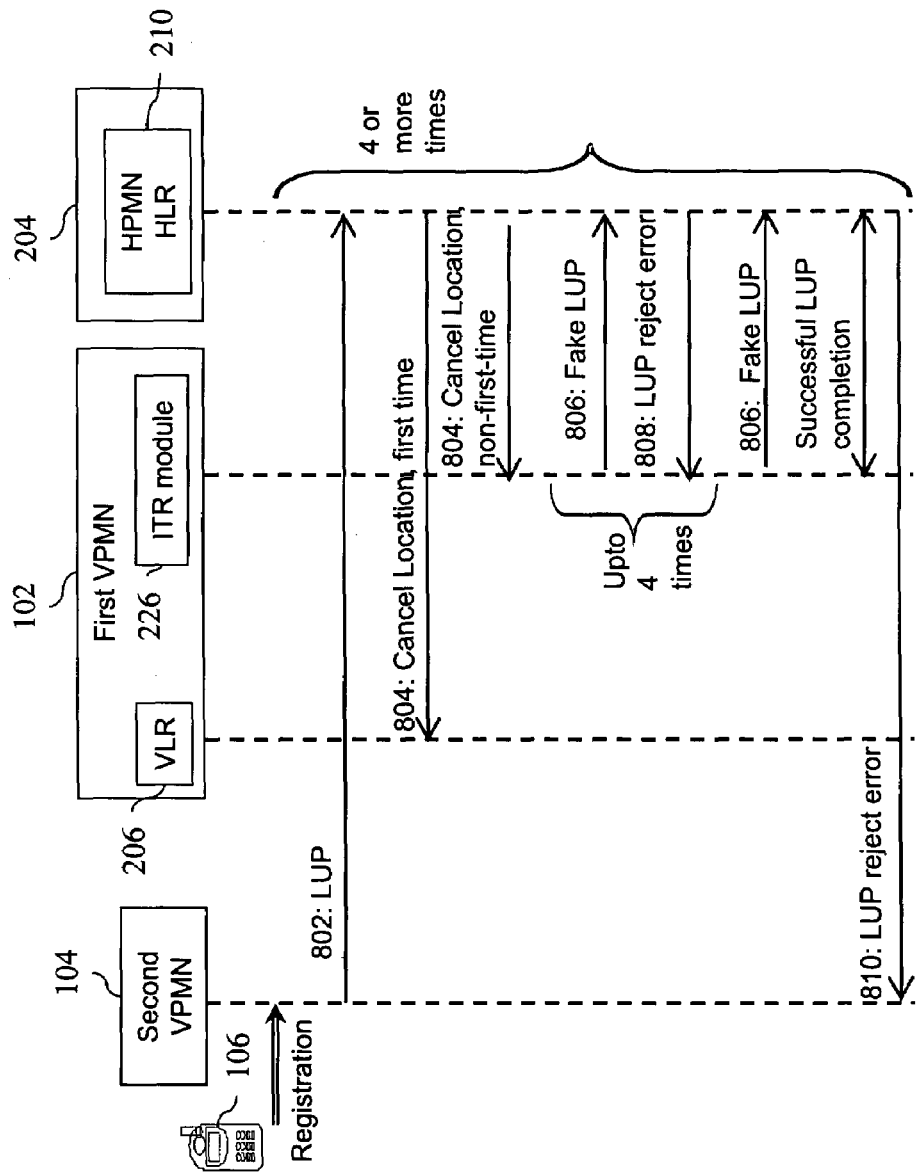
FIG. 8 represents a flow diagram for implementing the ITR in conjunction with countering of TR attempt initiated by the HPMN, in accordance with an embodiment of the invention.

FIG. 8 represents a flow diagram for implementing the ITR in conjunction with countering of TR attempt initiated by the HPMN, in accordance with an embodiment of the invention. Detection unit 228 in ITR module 226 detects a possible change in registration of inbound roaming mobile station 202 upon receipt of a Cancel Location message 804 at first VPMN 102 from HPMN 204. The possible change in the registration of inbound roaming mobile station 202 is inferred when a Location Update (LUP) message 802 being sent the first registration message from second VPMN 104 to HPMN 204. This LUP 802 is sent by second VPMN 104 after inbound roaming mobile station 202 attempts to (or is forced to attempt to) register with second VPMN 102. The registration cancellation message is a sent from HPMN HLR 210 to cancel the registration of inbound roaming mobile station 202 with first VPMN 102. Hence, detection unit 228 can deduce inbound roaming mobile station 202 is attempting to register with second VPMN 102. The registration cancellation message is a sent from HPMN HLR 210 to cancel the registration of inbound roaming mobile station 202 with first VPMN 102.

In this embodiment of the invention, system 200 (in FIG. 2) also includes an anti-TR unit (not shown in FIG. 2) for countering TR attempt by the HPMN based on one or more acknowledge messages sent by HPMN 204 in response to the one or more registration messages from the first VPMN. The one or more registration messages are one or more fake LUP messages 806. In one embodiment of the invention, the acknowledge message is a LUP reject error message 808. The examples of error in the LUP reject error include system failure, unexpected data value (UDV), missing data and the like. In another embodiment of the invention, the acknowledge message is a LUP abort error message. In case any of the two messages are received as the acknowledge messages the ITR module 226 continues to send one or more fake LUP messages 806 until a successful LUP transaction is completed or a threshold (e.g. T0) is reached. The ITR module 226 sends these fake LUP messages 806 on behalf of inbound roaming mobile station 202. Thereafter, the HPMN 204 sends a LUP reject error 810 to second VPMN 104. Based on the attributes in the acknowledge message 808, the ITR module 226 decides whether to apply Anti-TR using the anti-TR unit or abandon the ITR attempt.

The acknowledge message can contain either a UDV, RNA or RR or system failure or missing data or any other error as the attribute. As per the configuration of the ITR deploying VPMN, in case, the LUP reject error 808 contains the UDV (which is an IR 73 compliant TR error) from a dedicated HPMN GT after the fake LUP message 806, the ITR module may abandon the current ITR attempt. In other words, no more subsequent fake LUP messages 806 will be made on inbound roaming mobile station 202. A HPMN GT is considered dedicated for TR using UDV, if it is the only GT used for sending UDV in a TR solution. However if the LUP reject error 808 is system failure or missing data (which are non complain to IR 73), then the anti-TR unit (i.e. anti-non-compliant TR solution) may be applied within the current ITR attempt. The anti-TR unit is referred to as anti-non-compliant TR solution in a VPMN if the anti-TR unit is only applied to non-compliant errors (such as system error and missing values) used by a HPMN TR solution. The integrated ITR and Anti-TR solution works for both active monitoring and passive monitoring mode.

In case the attribute in the acknowledge message is the RNA or RR the ITR mechanism is modified in such a way that, the ITR module 226 immediately retries until a successful transaction or a threshold is reached as it can be deduced that the HPMN 204 is applying TR on inbound roaming mobile station 202. In this case, current ITR attempt may be abandoned. This solution works for both active and passive mode ITR. Further, to confirm that the HPMN 204 is performing ITR, the decision to abandon the ITR might be concluded only after RNA is received in acknowledge message for a configurable number of successive times of the fake LUP messages 806 on inbound roaming mobile station 202. OTA based case may be dealt independently by the anti-TR unit since it does not have to be tied with location update. In particular, in the active monitoring mode, the ITR attempt can be combined with GLR technology.

GLR Based Approach

Figure 9:
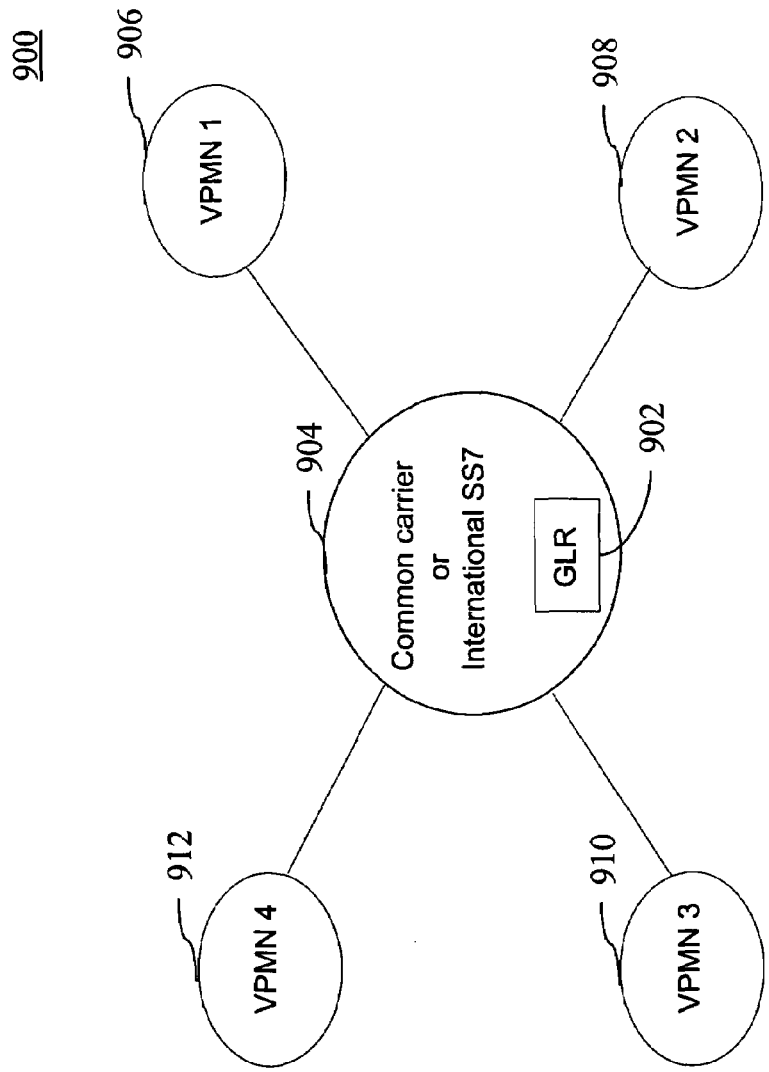
FIG. 9 represents a system diagram implementing the ITR using a GLR based technology, in accordance with an embodiment of the invention.

FIG. 9 represents a system diagram implementing or complimenting the ITR using a GLR technology, in accordance with an embodiment of the invention. The system 900 includes a GLR 902 deployed in a hosting location by an international SS7 carrier or a common carrier 904 for multiple VPMN operators. Exemplary VPMN operators are VPMN 1 906, VPMN 2 908, VPMN 3 910 and VPMN 4 912. The participating operators can even be from the same country. For each participating operator (i.e., the VPMN), GLR 902 is configured to only route transactions of those inbound roamers from the HPMN that are doing TR against them. In one embodiment of the invention, GLR 902 stores profile of inbound roaming mobile station 202 when HPMN 204 is detected performing a TR by monitoring actively the receipt of the first registration cancellation message between HPMN 204 and first VPMN 102. The profile of a successful registration is stored locally for a configurable interval of time so to avoid subsequent location update with the HPMN within the VPMN or even back to the VPMN again.

Whenever a Cancel Location comes from the HLR of the HPMN that is doing TR against the VPMN, the GLR 902 cancels its local profile in addition to the local profile in the real VPMN VLR. Alternatively, whenever a Cancel Location comes from the HLR of the HPMN that is doing TR against the VPMN, the GLR 902 cancels the real VLR profile while still maintaining the roamer profile at the GLR as long as the configurable interval of time for the profile is not expired. Hence, whenever the inbound roamer returns back to the VPMN within the expiration of the configurable interval of time, the inbound roamer can register using the roamer profile from GLR 902 without performing the location update with the HPMN network.

However the inbound roamer will be unable to receive calls and SMS for a while until the configurable interval of time is expired. To avoid such a situation, in another embodiment of the invention, after the returning inbound roamer is successfully registered via the GLR 902, GLR 902 continues to issue fake LUP messages (i.e., the one or more registration messages from first VPMN 102) to the HPMN until the location update is successful. The fake LUP messages are sent accordingly the global title corresponding to the VPMN network where the inbound roamer is currently located. Since the handset is already registered, GLR 902 can issue each successive fake LUP message at any configurable interval without worrying the handset state. As a result, the HPMN network will be unable to distinguish between a GLR location update and a real inbound roamer location update. In one embodiment of the invention; GLR 902 unit can be integrated with ITR module in a same platform in such a way that the GLR 902 can be independently applied outside the ITR and dependently applied inside the ITR.

In Bound Traffic Redirection with Anti-competitor ITR

Figure 10:
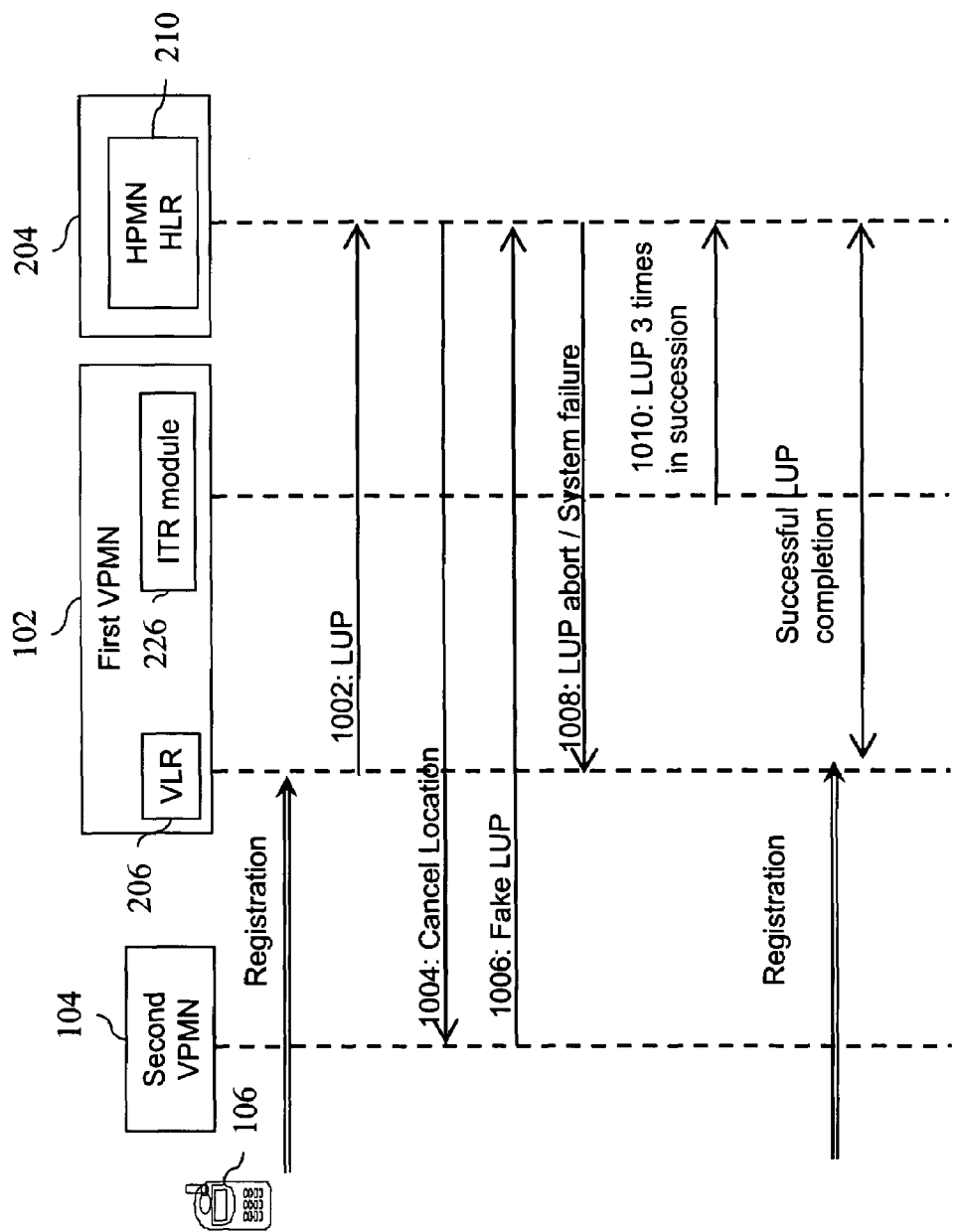
FIG. 10 represents a flow diagram for performing ITR attempt to counter an ITR attempt from a competitor network, in accordance with an embodiment of the invention.

FIG. 10 represents a flow diagram for performing ITR attempt to counter an ITR attempt from a competitor network, in accordance with an embodiment of the invention. In this embodiment the case where an ITR module is also deployed at second VPMN 104 in addition to the ITR module 226 at first VPMN 102, is considered. When inbound roaming mobile station 202 attempts to register with first VPMN 102, first VPMN 102 sends a LUP message 1002 to HPMN HLR 210. Thereafter, HPMN HLR 210 sends a Cancel Location message 1004 to VLR of second VPMN 104. The ITR module in second VPMN 104 sends a fake LUP message 1006 to HPMN HLR 210. Thereafter, HPMN HLR 210 sends a LUP abort/ system failure message 1008 to first VPMN 102. Upon receiving the error message 1008, ITR module can infer the presence of another ITR module at second VPMN 104. Hence, in order to thwart the ITR attempt from the competitor VPMN, i.e., second VPMN 104, ITR module 226 sends fake LUP message 1010 three or more times in succession to defeat the competitor ITR mechanism and when the mobile handset is trying another location attempt, there will be a successful transaction recorded at the HPMN HLR 210 since the competitor ITR mechanism perceives the handset in a manual mode or the second VPMN has no coverage, thereby avoiding the ITR from the competitor.

Computer Software Utility

A computer usable medium provided herein includes computer usable program code, which when executed controls the traffic of an inbound roaming mobile station between a first VPMN, a second VPMN and a HPMN by detecting a possible change in registration of the inbound roaming mobile station upon receipt of a first registration cancellation message of one or more registration cancellation messages at the first VPMN from the HPMN. The computer usable medium further includes computer usable program code for attempting to redirect the traffic to the first VPMN by sending one or more registration messages from the first VPMN to the HPMN subsequent to receipt of the one or more registration cancellation messages from the HPMN. For each registration cancellation message received, one or more registration messages are sent within a first pre-defined interval of time (T0) till one registration message is recorded as a successful transaction. Further, for all registration cancellation messages received in current attempt to redirect the inbound roaming mobile station to the first VPMN, the one or more registration messages are sent either within a second pre-defined interval of time (T1) and/or a re-registration threshold number of times.

The Inbound Traffic redirection System (ITRS) can be used by a VPMN operator to retain departing inbound roamers attempting to register at competitor networks due to bad coverage or blind spots of the VPMN operator. The Inbound Traffic redirection System (ITRS) can also be used by a VPMN operator against those HPMN operators that turned down the request to disclose that they deploy traffic redirection against the VPMN operator or applying non-compliant TR methods. In other cases the ITRS may be used by the VPMN operator to prevent against a possible ITR attempt from a competitor VPMN network. In other words, the ITRS can also be used to stop the leaking of inbound roaming traffic to the competing VPMN operator doing inbound traffic redirection. It can also be used to cache the roaming profiles of successfully registered inbound roamers so to avoid subsequent traffic redirections by the HPMN or the competitor VPMN operators that have deployed traffic redirection against the VPMN operator. The detection aspect of the ITRS will also help the VPMN operator prepare business impact and rescue actions.

The components of ITRS described above include any combination of computing components and devices operating together. The components of the ITRS can also be components or subsystems within a larger computer system or network. The ITRS components can also be coupled with any number of other components (not shown), for example other buses, controllers, memory devices, and data input/output devices, in any number of combinations. In addition any number or combination of other processor based components may be carrying out the functions of the ITRS.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the ITRS is not intended to be exhaustive or to limit the ITRS to the precise form disclosed. While specific embodiments of, and examples for, the ITRS are described herein for illustrative purposes, various equivalent modifications are possible within the scope of the ITRS, as those skilled in the art will recognize. The teachings of the ITRS provided herein can be applied to other processing systems and methods. They may not be limited to the systems and methods described above.

The elements and acts of the various embodiments described above can be combined to provide further embodiments. These and other changes can be made to the ITRS in light of the above detailed description.

Other Variations

Provided above for the edification of those of ordinary skill in the art, and not as a limitation on the scope of the invention, are detailed illustrations of a scheme for controlling traffic between HPMN, first VPMN and second VPMN of the inbound roaming mobile station. Numerous variations and modifications within the spirit of the present invention will of course occur to those of ordinary skill in the art in view of the embodiments that have been disclosed. For example the present invention is implemented primarily from the point of view of GSM mobile networks as described in the embodiments. However, notwithstanding, the present invention may also be effectively implemented on CDMA, 3G, WCDMA, GPRS, WiFi, WiMAX, VOIP etc., or any other network of common carrier telecommunications in which end users are normally configured to operate within a "home" network to which they normally subscribe, but have the capability of also operating on other neighboring networks, which may even be across international borders.

The examples under the present invention Inbound Traffic redirection System (ITRS) detailed in the illustrative examples contained herein are described using terms and constructs drawn largely from GSM mobile telephony infrastructure. But use of these examples should not be interpreted to limiting the invention to those media. Inbound Traffic redirection System—a method for controlling traffic between HPMN, first VPMN and second VPMN of the inbound roaming mobile station in a manner that is agnostic to the capabilities of the visited or non-accustomed network can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices,; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the ITRS under the present invention, this specification follows the path of a telecommunications call from a calling party to a called party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

TECHNICAL REFERENCES

"Method And System For Cellular Network Traffic redirection" application Ser. No. 10/635,804 filed on Aug. 5, 2003.

"Method and Apparatus for Defense Against Network Traffic redirection" application Ser. No. 60/662,030 filed Mar. 14, 2005.

Q71X SCCP

Q70X MTP

Q77X TCAP
GSM 1111 SIM and Mobile Interface
GSM 1114 SIM Toolkit
IR 7320 Steering of Roaming
GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+);
Technical realization of the Short Message Service (SMS);
(GSM 03.40 version 7.4.0 Release 1998)
GSM 348 Security and OTA,
GSM 31048 Security and OTA,
GSM 23119 Gateway Location Register,
GSM 408 Mobile Radio Interface Network Layer
GSM 23122 Mobile Station Procedure
GSM 24008 Mobile Radio Interface Network Layer
GSM22011 Service Accessibility
GSM25304 Idle Mode Selection
GSM29010 Error Network Mapping
GSM 29002 MAP Protocol

APPENDIX

| Acronym | Description |
| --- | --- |
| 3G | Third generation of mobile |
| ATI | Any Time Interrogation |
| BSC | Base Station Controller |
| ATR | Anti-Traffic Redirection |
| BCSM | Basic Call State Model |
| CAMEL | Customized Application for Mobile Enhanced Logic |
| CDMA | Code Division Multiplexed Access |
| CLI | Calling Line Identification |
| CgPA | Calling Party Address |
| CdPA | Called Party Address |
| CAP | Camel Application Part |
| CC | Country Code |
| CB | Call Barring |
| CSI | Camel Subscription Information |
| DPC | Destination Point Code |
| GMSC -H | HPMN Gateway MSC |
| GMSC | Gateway MSC |
| GPRS | General Packet Radio System |
| GLR | Gateway Location Register |
| GSM | Global System for Mobile |
| GSM SSF | GSM Service Switching Function |
| GT | Global Title |
| HLR -H | HLR from HPMN |
| HLR | Home Location Register |
| HPMN | Home Public Mobile Network |
| IMSI | International Mobile Subscriber Identity |
| IN | Intelligent Network |
| ISG | International Signal Gateway |
| INAP | Intelligent Network Application Part |
| ISD | MAP Insert Subscriber Data |
| IAM | Initial Address Message |
| IDP | Initial DP IN/CAP message |
| ISUP | ISDN User Part |
| ITR | Inbound Traffic Redirection |
| LUP | MAP Location Update |
| MAP | Mobile Application Part |
| MCC | Mobile Country Code |
| MCC | Mobile Country Code |
| ME | Mobile Equipment |
| MNC | Mobile Network Code |
| MO | Mobile Originated |
| MSC | Mobile Switching Center |
| MSISDN | Mobile Subscriber ISDN Number |
| MSRN | Mobile Subscriber Roaming Number |
| MT | Mobile Terminated |
| MTP | Message Transfer Part |
| NP | Numbering Plan |
| NPI | Numbering Plan Indicator |
| NDC | National Dialing Code |

APPENDIX-continued

| Acronym | Description |
| --- | --- |
| ODB | Operator Determined Barring |
| OTA | Over The Air |
| O-CSI | Originating CAMEL Subscription Information |
| PRN | Provide Roaming Number |
| PRI | Provider Subscriber Information |
| RNA | Roaming Not Allowed |
| RR | Roaming Restricted due to unsupported feature |
| RI | Routing Indicator |
| SPC | Signal Point Code |
| SRI | Send Routing Information |
| SCCP | Signal Connection Control part |
| STP | Signal Transfer Point |
| STP-H | HPMN STP |
| SRI-SM | Send Routing Information For Short Message |
| SSP | Service Switch Point |
| SSN | Sub System Number |
| SIM | Subscriber Identify Module |
| STK | SIM Tool Kit Application |
| SM-RP-UI | Short Message Relay Protocol User Information |
| STP | Signal Transfer Point |
| SS | Supplementary Services |
| TR | Traffic redirection |
| T-CSI | Terminating CAMEL Service Information |
| TP | SMS Transport Protocol |
| UDHI | User Data Header Indicator |
| UDH | User Data Header |
| UD | User Data |
| VAS | Value Added Service |
| VLR-V | VLR from VPMN |
| VLR | Visited Location Register |
| VMSC | Visited Mobile Switching Center |
| VPMN | Visited Public Mobile Network |

I claim:

1. A method for controlling traffic of an inbound roaming mobile station between a first Visiting Public Mobile Network (VPMN), a second VPMN and a Home Public Mobile Network (HPMN), the method comprising:
    detecting a possible change in registration of the inbound roaming mobile station upon receipt of a first registration cancellation message of one or more registration cancellation messages at the first VPMN from the HPMN;
    attempting to redirect the traffic to the first VPMN by sending one or more registration messages from the first VPMN to the HPMN subsequent to receipt of the one or more registration cancellation messages from the HPMN, wherein for each registration cancellation message received, one or more registration messages are sent within a first pre-defined interval of time (T0) until one registration message is recorded as a successful transaction, wherein for the one or more registration cancellation messages received in current attempt to redirect the inbound roaming mobile station to the first VPMN, the one or more registration messages are sent within one of a second pre-defined interval of time (T1) and a threshold number of times to attempt re-registration.

2. The method of claim 1, wherein the possible change in the registration of the inbound roaming mobile station is inferred when a location update (LUP) message being sent a first registration message from the second VPMN.

3. The method of claim 1, wherein the one or more registration messages are LUP messages sent from the first VPMN.

4. The method of claim 1, wherein the one or more registration cancellation messages is a Cancel Location message sent by the HPMN to the first VPMN.

5. The method of claim 1 further comprising exchanging the one or more registration messages corresponding to each of one or more registration cancellation messages received from the HPMN, wherein the one or more registration cancellation messages are sent subsequent to each registration message sent by the inbound roaming mobile station after an error is generated at the inbound roaming mobile station.

6. The method of claim 5, wherein each registration message is sent at most equal to an expected number of times by the inbound roaming mobile station.

7. The method of claim 1 further comprising receiving a reject message at the second VPMN when the attempt to redirect the traffic to the first VPMN is successful.

8. The method of claim 1, wherein a general packet radio system (GPRS) location update (LUP) message is exchanged as a first registration message between the HPMN and a servicing GPRS support node (SGSN) associated with the second VPMN.

9. The method of claim 8, wherein the one or more registration messages is a GPRS LUP message sent from the first VPMN.

10. The method of claim 1, wherein the one or more registration messages are sent at most equal to the re-registration threshold number of times of a re-registration counter.

11. The method of claim 10, wherein the second pre-defined interval of time (T1) is equal to an expiration threshold at which the re-registration counter is reset.

12. The method of claim 1, wherein the second pre-defined interval of time (T1) is sum of maximum interval between the one or more registration messages and maximum interval to select the second VPMN for a location update attempt multiplied by number of competitor network operators in country.

13. The method of claim 1, wherein the first pre-defined interval of time (T0) is at most equal to time required for completing location update process for the second VPMN.

14. The method of claim 1 further comprises sending a response message on behalf of the inbound roaming mobile station in response to receipt of one or more request messages when the one or more registration cancellation messages are received after completion of location update process at the second VPMN.

15. The method of claim 14, wherein the one or more request messages are one of a mobile application part (MAP) provider subscriber information (PSI) from the HPMN, MAP Provide Roaming Number (PRN) from the HPMN and a MAP Forward short message service (SMS) from a short message service center (SMSC).

16. The method of claim 14, wherein the response message is an Absent Subscriber message sent on behalf of the inbound roaming mobile station.

17. The method of claim 1 further comprising attempting to redirect the traffic to a third VPMN when the attempt to redirect the traffic to the first VPMN is unsuccessful.

18. The method of claim 17, wherein the third VPMN is a preferred network to the first VPMN in comparison to the second VPMN being a non-preferred network to the first VPMN.

19. The method of claim 1, wherein the one or more registration messages from the first VPMN are sent using one or more global titles subsequent to receipt of the one or more registration cancellation messages.

20. The method of claim 19, wherein one of the one or more global titles is a global title of the first VPMN.

21. The method of claim 1 further comprising storing visited location register (VLR) and home location register (HLR) corresponding to an international mobile subscriber identity (IMSI) of the inbound roaming mobile station corresponding to each of the one or more registration messages sent from the first VPMN to the HPMN.

22. The method of claim 21 further comprising detecting a possible change in VLR association of the inbound roaming mobile station in the first VPMN based on next received registration cancellation message from the HPMN.

23. The method of claim 22 further comprising incrementing one or more redirection counters based on the possible change in the VLR association of the inbound roaming mobile station in the first VPMN.

24. The method of claim 1 further comprising sending a routing request immediately prior to sending the one or more registration messages to the HPMN.

25. The method of claim 24 further comprising sending the one or more registration messages to the HPMN subsequent to receipt of an acknowledgment of the routing request from the HPMN.

26. The method of claim 25 further comprises sending the one or more registration messages to the HPMN subsequent to absence of a response for the routing request within an interval of time.

27. The method of claim 26 further comprising blacklisting an home location register (HLR) associated with the HPMN for a pre-defined time interval in absence of a response to the routing request for a configurable number of times from the HPMN.

28. The method of claim 26 further comprising blacklisting an home location register (HLR) associated with the HPMN for a pre-defined time interval if an error or a response to the routing request from a global title (GT) in an inbound traffic redirection (ITR) module.

29. The method of claim 26 further comprising blacklisting an home location register (HLR) associated with the HPMN for a pre-defined time interval if an error or a response to the routing request from a global title (GT) in an inbound traffic redirection (ITR) module, after an interval of delay between that routing request and a fake location update (LUP).

30. The method of claim 26, wherein the routing request is one of a send routing information for short message (SRI-SM) message, a send routing information (SRI) message, and an any time interrogation (ATI) message.

31. The method of claim 26 further comprising
determining the second VPMN as a non-inbound traffic redirection (ITR) attempting network based on response received from the HPMN in response to the routing request and application of a pre-defined criteria on the response; and
allowing the inbound roaming mobile station to register with the second VPMN by discontinuing the sending of the one or more registration messages.

32. The method of claim 1 further comprising sending a search request message concurrently with each of the one or more registration messages after receipt of the one or more registration cancellation messages from the HPMN and before relaying the one or more registration cancellation messages to a VLR in the first VPMN, wherein the search request message is sent to a VMSC to collect location information of the inbound roaming mobile station.

33. The method of claim 30, wherein the visited mobile switching center (VMSC) is a last known VMSC of the inbound roaming mobile station.

34. The method of claim 30, wherein the search request message is one of a Search Mobile Station (MS) and a Page Mobile Station (MS).

35. The method of claim 1 further comprising abandoning the attempt to redirect the traffic when the inbound roaming mobile station attempts greater than an expected number of times to register with the second VPMN.

36. The method of claim 1 further comprising abandoning the attempt to redirect the traffic when the inbound roaming mobile station attempts greater than a registration threshold to register with the second VPMN.

37. The method of claim 1 further comprising abandoning the attempt to redirect the traffic when the inbound roaming mobile station is detected to be in a manual mode.

38. The method of claim 1 further comprising abandoning the attempt to redirect the traffic when the inbound roaming mobile station is detected to be present in non-coverage area of the first VPMN.

39. The method of claim 1 further comprising countering traffic redirection (TR) attempt by the HPMN based on one or more acknowledge messages sent by the HPMN in response to the one or more registration messages from the first VPMN.

40. The method of claim 37, wherein the one or more acknowledge messages is one of a location update (LUP) reject error and a LUP abort error.

41. The method of claim 37, wherein the one or more acknowledge messages comprises one or more attributes selected from a group consisting one a unexpected data value (UDV), roaming not allowed (RNA) and roaming restricted (RR).

42. The method of claim 37 further comprising attempting to redirect the traffic to the first VPMN in combination with the countering of the traffic redirection (TR) attempt from HPMN when the one or more acknowledge messages is a system failure.

43. The method of claim 40 further comprising sending one or more location update messages greater than an expected number of times until a successful exchange of the one or more registration message between the first VPMN and the HPMN, wherein the one or more location update messages are sent to thwart at least one of the traffic redirection (TR) attempt from the HPMN and an inbound traffic redirection (ITR) attempt from the second VPMN.

44. The method of claim 41, wherein one or more location update messages are sent from the first VPMN on behalf of the inbound roaming mobile station.

45. The method of claim 1 further comprised of storing profile of the inbound roaming mobile station in a gateway location register (GLR) when the HPMN is detected performing a traffic redirection (TR) by monitoring actively the receipt of the first registration cancellation message between the HPMN and the first VPMN.

46. The method of claim 43, wherein a profile is stored for a configurable interval of time.

47. The method of claim 43 further comprised of exchanging successfully the one or more registration messages between the gateway location register (GLR) and the HPMN.

48. The method of claim 1, wherein detecting a possible change in registration of the inbound roaming mobile station comprises monitoring passively receipt of one or more registration cancellation messages at the first VPMN from the HPMN.

49. The method of claim 1, wherein detecting a possible change in registration of the inbound roaming mobile station comprises monitoring actively receipt of one or more registration cancellation messages at the first VPMN from the HPMN.

50. The method of claim 1 further comprised of incrementing one or more redirection counters when the attempt to redirect the traffic is successful.

51. The method of claim 1 further comprised of defining a redirection limit for the inbound roaming mobile station at a configurable interval of time.

52. The method of claim 1 further comprised of defining a configuration distribution control profile for one or more inbound roaming mobile stations in the HPMN, wherein the configuration distribution control profile supports in decision of attempt to redirect the traffic.

53. The method of claim 50, wherein the configuration distribution control profile is activated at different time bands for one or more inbound roaming mobile stations.

54. The method of claim 50, wherein one or more parameters in the configuration distribution control profile are measured by a configurable counter.

55. The method of claim 1 further comprised of identifying a blind spot in the first VPMN based on a reply message in response to sending a subscriber information message to a visited location register (VLR) associated with the inbound roaming mobile station, wherein the subscriber information message is sent before relaying the first registration cancellation message from the HPMN to the first VPMN.

56. The method of claim 53, wherein the subscriber information message is a PSI message being sent after successful attempt to redirect the traffic to the first VPMN.

57. The method of claim 54, wherein the visited location register (VLR) pages the inbound roaming mobile station in anticipation of a reply from the inbound roaming mobile station indicating a current location and a cell in the first VPMN.

58. The method of claim 1 further comprises providing value added services to the inbound roaming mobile station after failing in the attempt to redirect the traffic of the inbound roaming mobile station to the first VPMN, and response to a routing request returns a competitor network.

59. A system for controlling traffic of an inbound roaming mobile station between a first Visiting Public Mobile Network (VPMN), a second VPMN and a Home Public Mobile Network (HPMN), the method comprising:
a detection unit for detecting a possible change in registration of the inbound roaming mobile station upon receipt of a first registration cancellation message of one or more registration cancellation messages at the first VPMN from the HPMN; and
a redirection unit for attempting to redirect the traffic to the first VPMN by sending one or more registration messages from the first VPMN to the HPMN subsequent to receipt of the one or more registration cancellation messages from the HPMN, wherein for each registration cancellation message received, one or more registration messages are sent within a first pre-defined interval of time (T0) until one registration message is recorded as a successful transaction, wherein for the one or more registration cancellation messages received in a current attempt to redirect the inbound roaming mobile station to the first VPMN, the one or more registration messages are sent within one of a second pre-defined interval of time (T1) and a threshold number of times to attempt re-registration.

* * * * *